(12) United States Patent
Kaimal et al.

(10) Patent No.: US 12,160,450 B2
(45) Date of Patent: Dec. 3, 2024

(54) ADMISSION CONTROL IN A CONTAINERIZED COMPUTING ENVIRONMENT

(71) Applicant: Sophos Limited, Abingdon (GB)

(72) Inventors: Biju Ramachandra Kaimal, Bangalore (IN); Jeffrey Martin Green, Brentwood, TN (US); Shwetank Shwetank, Patna (IN)

(73) Assignee: Sophos Limited, Abington (GB)

( * ) Notice: Subject to any disclaimer, the term of this patent is extended or adjusted under 35 U.S.C. 154(b) by 301 days.

(21) Appl. No.: 17/749,474

(22) Filed: May 20, 2022

(65) Prior Publication Data

US 2023/0319112 A1    Oct. 5, 2023

(30) Foreign Application Priority Data

Apr. 5, 2022 (IN) .............................. 202211020534

(51) Int. Cl.
*H04L 9/40* (2022.01)

(52) U.S. Cl.
CPC .................................. *H04L 63/20* (2013.01)

(58) Field of Classification Search
CPC ...................................................... H04L 63/20
USPC ............................................................. 726/1
See application file for complete search history.

(56) References Cited

U.S. PATENT DOCUMENTS

| | | | |
|---|---|---|---|
| 10,104,185 B1 | 10/2018 | Sharifi Mehr et al. | |
| 10,503,623 B2 * | 12/2019 | Keller | G06F 9/45558 |
| 10,785,122 B2 * | 9/2020 | Inamdar | H04L 41/082 |
| 10,983,848 B2 * | 4/2021 | Degioanni | G06F 9/45558 |
| 11,042,643 B2 * | 6/2021 | Gupta | G06F 9/5077 |

(Continued)

FOREIGN PATENT DOCUMENTS

CN        113569232 A        10/2021

OTHER PUBLICATIONS

Combined Search and Examination Report in UK patent application No. GB2303443.2 mailed on Sep. 13, 2023.

(Continued)

*Primary Examiner* — Dant B Shaifer Harriman
(74) *Attorney, Agent, or Firm* — Schmeiser, Olsen & Watts LLP; Victor J. Baranowski

(57) ABSTRACT

A method for performing admission control in a containerized computing environment includes deploying, by one or more processors of a computer system, the containerized computing environment, receiving, by the containerized computing environment, constraints associated with admission control for containers, the constraints related to container security and receiving, by the containerized computing environment, a request for creating a container. The method includes determining, by an admission controller of the containerized computing environment, a quality metric of the container associated with the received request, performing, by the admission controller of the containerized computing environment, admission control prior to the creating of the container by applying the constraints using the determined quality metric, and allowing or disallowing, by the admission controller of the containerized computing environment, creation of the container based on the performing the admission control.

20 Claims, 10 Drawing Sheets

(56) References Cited

U.S. PATENT DOCUMENTS

| | | | |
|---|---|---|---|
| 2013/0272121 A1* | 10/2013 | Stanwood | H04L 47/2475 370/230 |
| 2020/0021615 A1 | 1/2020 | Wainner et al. | |
| 2020/0112487 A1* | 4/2020 | Inamdar | H04L 43/08 |
| 2020/0174842 A1* | 6/2020 | Wang | H04L 67/63 |
| 2022/0116455 A1* | 4/2022 | Raghunath | H04L 67/146 |
| 2022/0342965 A1* | 10/2022 | Watanabe | G06F 11/3438 |
| 2023/0088858 A1* | 3/2023 | Tu | G06F 8/65 |
| 2024/0160425 A1* | 5/2024 | Gupta | G06F 9/5077 |
| 2024/0160453 A1* | 5/2024 | Ueda | G06F 9/44526 |
| 2024/0223667 A1* | 7/2024 | Nagpal | H04L 43/08 |

OTHER PUBLICATIONS

"Gatekeeper" 2019, GitHub, Inc., accessed May 19, 2022. https://github.com/open-policy-agent/gatekeeper.

Ducastel, Alexis "Benchmark results of Kubernetes network plugins (CNI) over 10Gbit/s network" ITNEXT, Sep. 8, 2020, accessed May 19, 2022. https://itnext.io/benchmark-results-of-kubernetes-network-plugins-cni-over-10gbit-s-network-updated-august-2020-6e1b757b9e49.

Kim, et al. "Flexible network address mapping for container-based clouds" Proceedings of the 2015 1st IEEE Conference on Network Softwarization (NetSoft), Apr. 13, 2015.

* cited by examiner

ADMISSION CONTROL IN A CONTAINERIZED COMPUTING ENVIRONMENT

RELATED APPLICATION

This application claims the benefit of the earlier filing date of Indian Patent Application Serial No. 202211020534 filed Apr. 5, 2022, the entirety of which is incorporated herein by reference.

FIELD

The present disclosure relates to generally to cybersecurity in a containerized computing environment. More specifically, this application relates to using quality scoring in admission control for controlling workloads in the containerized computing environment.

BACKGROUND

Containers are the cloud native solution for running application workloads or services. Containers are typically managed by a container orchestration system, such as Kubernetes, OpenShift, Mesos, or the like. On Kubernetes, for example, containers that are used in a deployment are started by a Kubelet component if a container image of the container is available on the system. If the container image is not available, it may be downloaded from a container repository specified in a service's deployment manifest files. However, a Kubelet does not check whether the container image that is used has any security vulnerabilities.

Admission control is a process by which a containerized computing environment can check whether a container meets certain requirements before the container is created, persisted, or otherwise used in the containerized computing environment. However, known admission control systems are not controlled by a cloud administrator in order to create and utilize rules or policies which integrate with the results of container inspection system that provide inspection information related to scanned containers.

The present disclosure solves the problem of verification of container vulnerability by allowing an administrator to specify through a policy that the containers running on a containerized computing environment are complaint with an organization's security posture.

SUMMARY

According to embodiments disclosed herein, a method, and associated computer system and computer program product for performing admission control in a containerized computing environment. According to the method, the containerized computing environment is deploying by one or more processors of a computer system. The containerized computing environment receives constraints associated with admission control for containers, the constraints related to container security, and further receives a request for creating a container. An admission controller of the containerized computing environment determines a quality metric of the container associated with the received request and performs admission control prior to the creating of the container by applying the constraints using the determined quality metric. The admission controller of the containerized computing environment allows or disallows creation of the container based on the performing the admission control.

BRIEF DESCRIPTION OF THE DRAWINGS

The above and further advantages of the foregoing may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the disclosed concepts and features.

DETAILED DESCRIPTION

Figure 1:
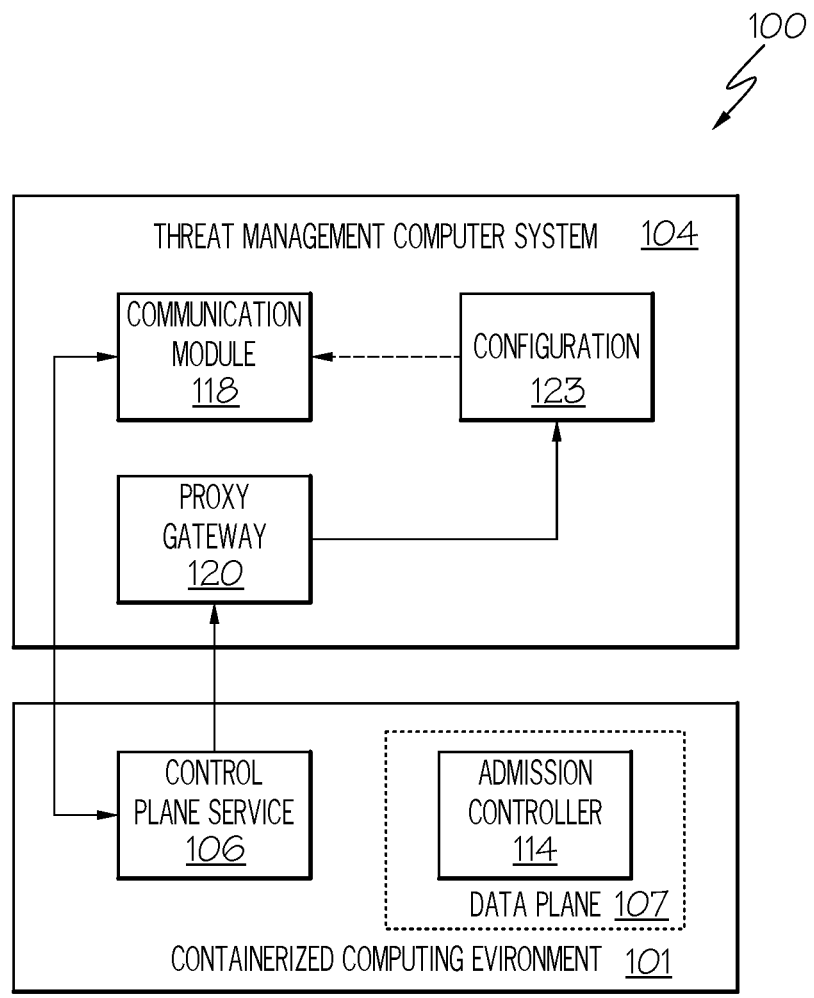
FIG. 1 depicts a computer system having a threat management computer system and a containerized computing environment according to an example embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location unless a different meaning is explicitly provided or otherwise clear from the context.

With the rise in popularity of container orchestration platforms, such as Kubernetes, OpenShift, Mesos, or the like, in hosting application workloads, so has the need to protect the workloads against security threats. Embodiments herein describe a container native firewall deployable into a containerized computing environment of a client, customer or enterprise facility. Embodiments of a container native firewall as described herein may be configured to protect the workload running in a containerized computing environment. Embodiments of the container native firewall may include a backend computer system located at, for example, a threat management facility operating as a cloud solution for the client, customer, or enterprise facility. An administrator at the threat management facility may specify parameters for how an admission controller checks may function in the containerized computing environment of the client, customer or enterprise facility. The admissions controller may further integrate with a container inspection system, such as Sophos® Cloud Optix, Black Duck®, SonarQube, or any other code inspection or software composition analysis (SCA) system. These inspection systems provide information that will allow the admission controller to check whether a given container, container image, or container software and the package the container belongs to meets certain quality gates. For example, the admission controller can make determinations as to the number of high priority bugs, code coverage, bug count, and the like, before a container is created, persisted and/or installed. In this manner, the admission controller described herein may be used to check the security posture of a container or container image before the container is created, persisted and/or installed by the orchestrator of the containerized computer environment. Thus, embodiments described herein provide for systems and methods which allow an administrator to specify through policies, rules or settings, that containers running on the system are complaint with the desired security posture of the client, customer or enterprise facility. Embodiments described herein enable administrators to allow containers from known repositories or without any high security vulnerabilities, or containers which pass any other set security controls, to be installed, created, persisted or the like.

FIG. 1 depicts a computer system 100 having a threat management computer system 104 and a containerized computing environment 101 according to an example embodiment. In some embodiments, the computer system 100 may include a container native firewall deployed by the threat management computer system 104 and operating to perform admission control functionality as described herein within the containerized computing environment 101. In other embodiments, the principles described in the methods and systems herein may be deployed in any container environment where an admission controller can perform checks on containers or pods during their creation, spawn or adding to a containerized computing environment. It should be understood that the containerized computing environment 101 may be one or more computers running a containerized orchestration.

The threat management computer system 104 may be considered a control plane, while the containerized computing environment includes a data plane 107. The data plane 107 components of the computer system 100 may be deployed on a client, customer or enterprise facility (e.g. the enterprise facility 902 shown in FIG. 9). Deployment of the data plane 107 may be on-promise, using bare-metal or virtualized servers, for example. Alternatively or additionally, the data plane 107 may be deployed on virtualized servers or on public cloud infrastructure like Amazon Web Services (AWS)® and/or Amazon Elastic Kubernetes Services (Amazon EKS), Azure®, Google Cloud®, or the like. The data plane 107 may be provided as a component of a containerized computing environment 101, such as one or more Kubernetes clusters, or the like. The data plane 107 is shown including a control plane service 106 which may be a software and/or hardware computing service that is installed locally at the client, customer or enterprise facility network in the data plane 107 and may be configured to receive and process updates or notifications from the threat management computer system 104. The data plane 107 further includes primary data plane components 107 including an admission controller system 114.

The threat management computer system 104 may be deployed as a cloud service, for example, and may be included as part of a threat management infrastructure (such as the threat management facility 900 shown in FIG. 9) which may be utilized by the client, customer or enterprise facility. Thus, the data plane 107 may be located on a business network (LAN or WAN) of a client, customer, or enterprise facility, whereas the threat management computer system 104 may be operable on a separate network and may be inclusive of a subscription threat management service, subscribed by the client, customer or enterprise facility. The control plane is shown including a communication module 118, a proxy gateway 120 (e.g. a server and/or firewall), as well as a configuration module 122. The configuration module 122 may include an interface which allows an administrator of the threat management computer system 104 at the threat management facility to provide rules, settings, and/or policy changes or the like to the data plane 107 and the containerized computing environment 101, as described in further detail below.

In accordance with embodiments contemplated, an administrator may interact with the computer system 100 through an interface that is provided in the threat management computer system 104 at the threat management computer system. For example, an administrator may log into a threat management software system located in the threat management computer system 104 of the threat management computer system and adds details of a containerized computing environment 101, such as a Kubernetes cluster, to begin deployment of the computer system 100 on the containerized computing environment 101. A helm command for deployment may be presented to the administrator in a UI associated with the threat management software system. The administrator may then run the Helm command on a terminal or endpoint that has access to the containerized computing environment 101 to install the control plane service 106 software in the data plane 107 of the containerized computing environment 101. The control plane service 106 in the containerized computing environment 101 may then start the registration process with the threat management computer system. At the end of this registration process, the containerized computing environment 101 may authenticate and communicate with the threat management computer system for further configuration operations and/or updates through the communication module 118.

Once onboarding has occurred, an administrator may log into the threat management computer system 104 of the threat management computer system which is connected to the containerized computing environment 101. The administrator may then select the particular containerized computing environment 101 or cluster to configure. While only one containerized computing environment 101 is shown, it should be understood that a customer, client or enterprise facility may include any number of separate containerized computing environments, clusters, pods or the like, as well as namespaces associated with those containerized computing environments. An administrator may be configured to provide policies, rules or settings associated with any number of containerized computing environments of the customer, client or enterprise facility. An administrator may be able to add, edit or delete different policies supported by the computer system 100, as described herein. An administrator can thus add or delete containerized computing environments from the user interface of the threat management computer system 104.

Figure 2:
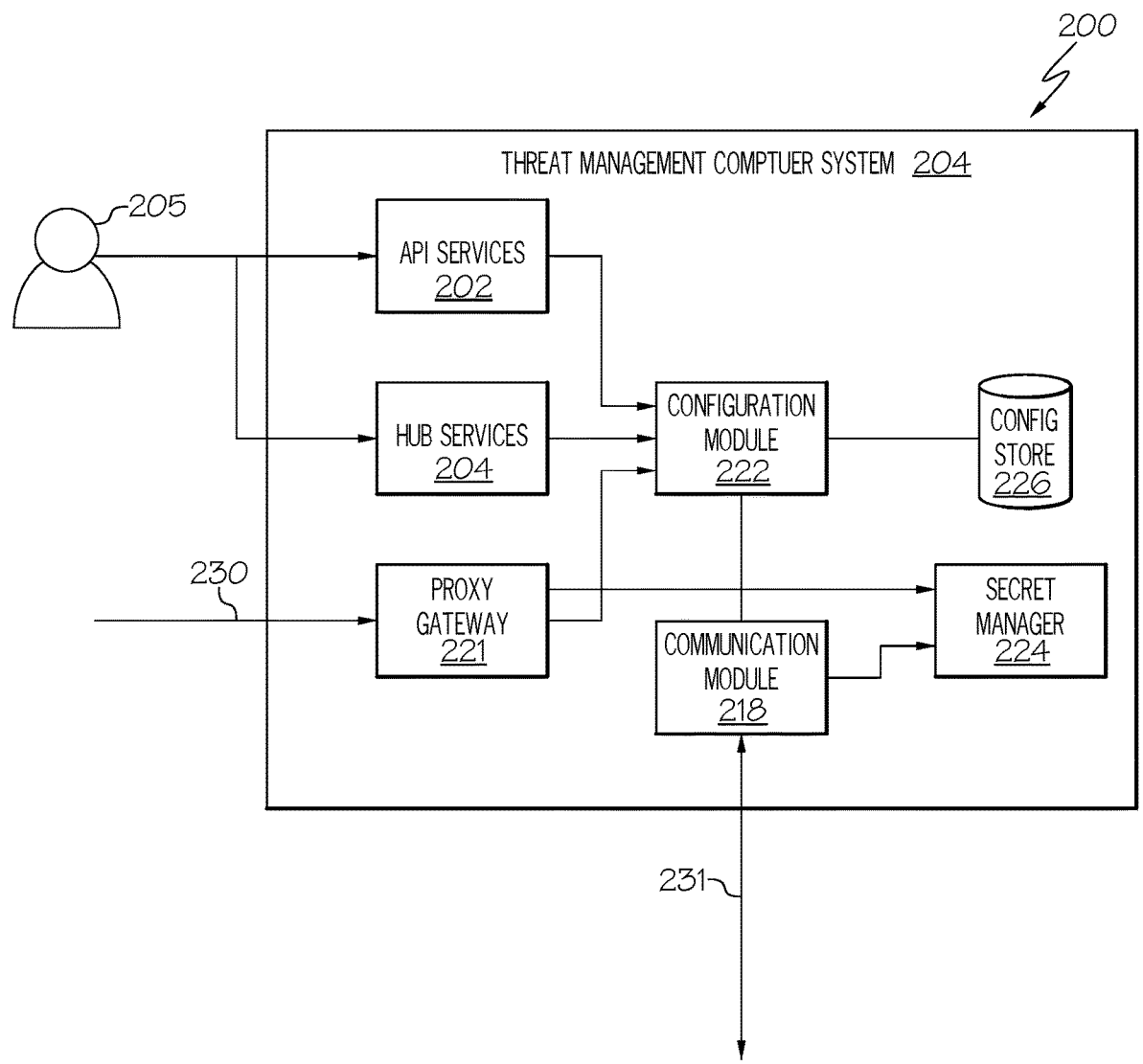
FIG. 2 depicts a threat management computer system portion of a container native firewall according to an example embodiment.

FIG. 2 depicts a threat management computer system 204 portion of a container native firewall according to an example embodiment. The threat management computer system 204 shown may be a more detailed view of the threat management computer system 104 shown in FIG. 1. The threat management computer system 204 includes application programming interface (API) services 202, hub services 203, a proxy gateway 220 (the same or similar as the proxy gateway 120), a configuration module 222 (the same or similar as the configuration module 122), a communication module 218 (the same or similar as the communication module 118), a secret manager 224 and a configuration store 226.

The API services 202 may be a means for the configuration module 222 to interact with a server-side UI system 205 to retrieve and update information coming from a user, such as an administrator. The administrator may use an administrator UI in order to create, edit, or delete policies, rules, settings or the like with the configuration module 222. Hub service 203 may provide a cache for public keys and may be used as a store for authentication information, authentication codes, proxy URLs, push server URLs and the like.

The proxy gateway 221 may be a feature of a public cloud infrastructure configured to communicate via channel 230 with the containerized computer environment, such as the control plane service 106 shown in FIG. 1. The proxy gateway 221 may check authentication codes, generate access and refresh tokens, and may be used in registering containerized computing environment (i.e. cluster) requests with the configuration module 222.

The configuration module 222 may be configured to register containerized computing environments (i.e. clusters), as well as retain and maintain configuration, policy, rules and/or settings associated with each registered containerized computing environment. The configuration module 222 may be any combination of hardware and/or software configured to process and execute the rules for the container native firewall solution. The configuration store 226 may be a network repository or database for storing information used by the configuration module 222.

The secret manager 224 may be an encryption service associated with a public cloud infrastructure, used to protect and manage secrets needed to access the container native firewall solution and/or the configuration module 222.

The communication module 218 may be a push notification gateway that communicates with the containerized computer environment, such as the control plane service 106 shown in FIG. 1. The communication module 218 may include any type of communication means, through channel 231, for providing updated rules, policies, settings or the like to the container native firewall and/or the containerized computing environment of the client, customer or enterprise.

Figure 3:
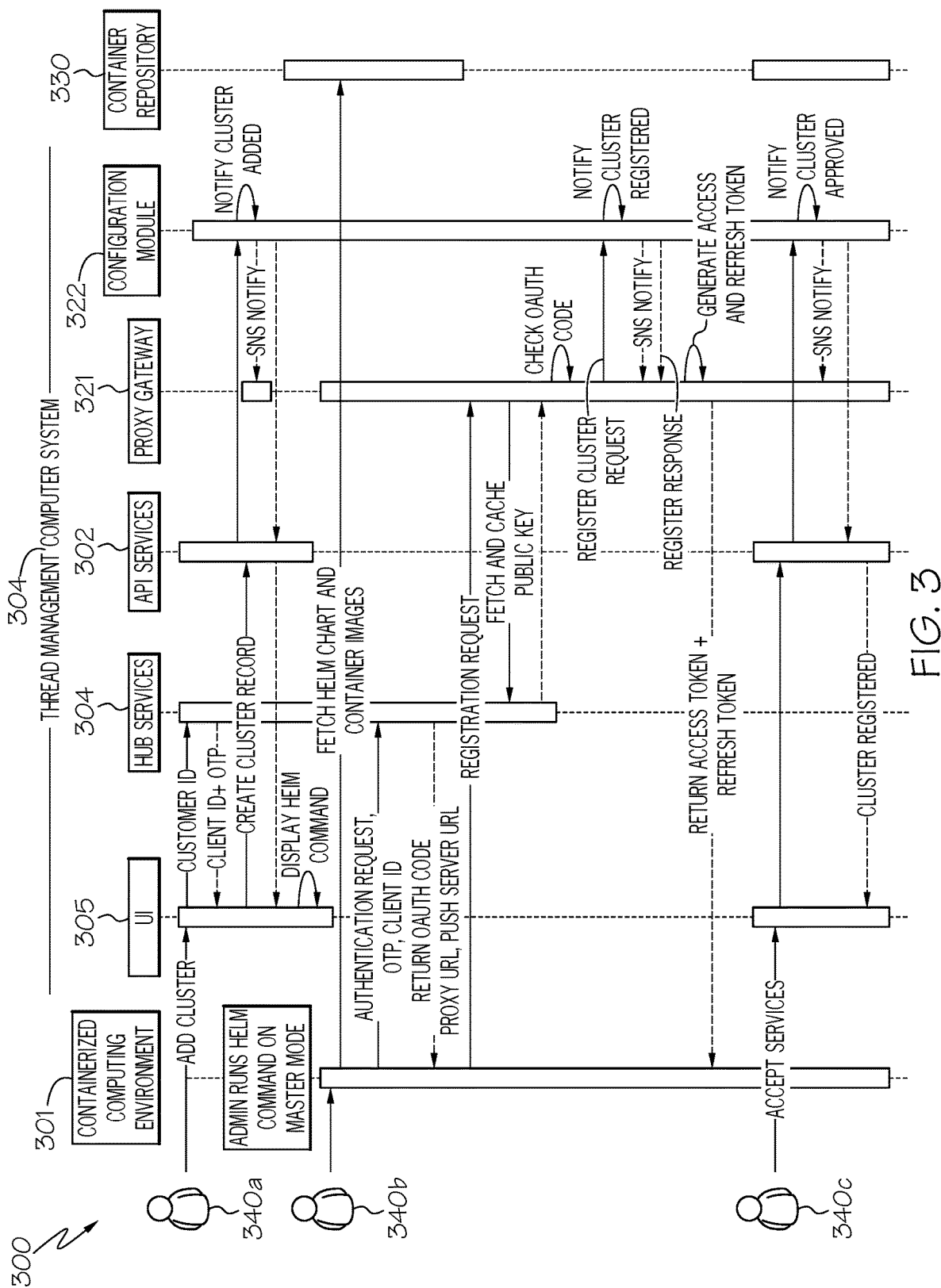
FIG. 3 depicts a registration sequence for onboarding a containerized computing environment according to an example embodiment.

FIG. 3 depicts a registration sequence 300 for onboarding a containerized computing environment according to an example embodiment. The registration sequence 300 includes registration steps performable by various features of a container native firewall system having containerized computing environment 301, such as a Kubernetes cluster (such as the containerized computing environment 101 shown in FIG. 1), connected to a threat management computer system 304 (such as the threat management computer systems 104, 204). The registration sequence 300 further includes a container repository 330, which may be a component of the threat management computer system 304, a component of the containerized computing environment 301, or a component of a third-party system connected to one or both of the threat management computer system 304 and the containerized computing environment 301. The threat management computer system 304 is shown including various features such as a user interface (UI) system 305, a hub service 303 (such as the hub service 203 shown in FIG. 2), API services 302 (such as API services 202 shown in FIG. 2), proxy gateway 321 (such as proxy gateway 221 shown in FIG. 2), and configuration module 322 (such as the configuration modules 122, 222). In accordance with the registration sequence 300, dashed lines represent a confirmation, response or return provided by a feature in response to a previous sequence step.

As shown, an administrator 340a first initiates the adding of a cluster (i.e. the containerized computing environment 301) using the UI system 305, which provides customer identification associated with the containerized computing environment 301 to the hub service 303. The hub service 303 then provides confirmation and/or validation of the customer identification and/or associated password or one-time password (OTP). From there the UI system 305 allows the administrator 340a to create a record of the added cluster 301 through the API services 302, which is then saved, stored or otherwise provided or added to the configuration module 322 (and a data repository thereof, such as the configuration store 226 shown in FIG. 2). A notification, such as through simple notification service (SNS), is then sent through the proxy gateway 321 that the cluster has been added by the configuration module 322. Confirmation of this added cluster is then provided, through the API services 302, to the UI system 305, which then displays a helm command to the administrator 340.

An administrator 340b (which may be the same or a different administrator as the administrator 340a), then runs a Helm command on a master node of the containerized computing environment 301. A helm chart is then fetched by the containerized computing environment 301 from the container repository 330, along with container images for the containerized computing environment 301. For example, software installation may be performed using the "Helm install" command that is presented to the administrator when a cluster is added. The Helm chart installation process may install the deployment YAML specifications of the containerized computing environment 301 for the services which would in turn download the container images associated with those services.

Next, the containerized computing environment 301, via the administrator 340b, initiates an authentication request with the hub service 303 by providing a one-time password and client identification, which returns an authorization code, a proxy URL and/or a push server URL. With this authorization information, the administrator 340b and/or the containerized computing environment 301 may then make a registration request through the proxy gateway 321, which fetches and caches a public key from the hub service 303. The proxy gateway 321 then checks the authorization code and registers the cluster request with the configuration module 322. A SNS notification is then created by the proxy gateway 321 and a registration response is then initiated by the configuration module 322 and sent to the proxy gateway 321. An access and refresh token is then generated by the proxy gateway 321 for return back to the containerized computing environment 301 and/or the administrator 340b.

From here, an administrator 340c (which may be the same as, or different than, one of the administrators 340a, 340b), accepts the services through the UI system 305. This acceptance is processed by API services 302 and provided to the configuration module 322. An SNS notification is then created by the configuration module 322 and sent via the proxy gateway. Further, notification is provided, through API services 302, to the UI system 305 for review and confirmation by one or more of the administrators 340a, 340b, 340c.

The registration sequence provides for an advantageous way to register, authenticate, and confirm registration with administrators, for a containerized computing environment to be accessible and administered by the threat management computer system 304 using the methods and systems described herein. Once a containerized computing environment is registered, the containerized computing environment can safely accept configuration elements of the container native firewall solution from the threat management computer system 304, including the creation of admission control policies which are used to specify the conditions under which a container can be installed, created and/or persisted in a containerized computing environment, such as a Kubernetes cluster.

Figure 4:
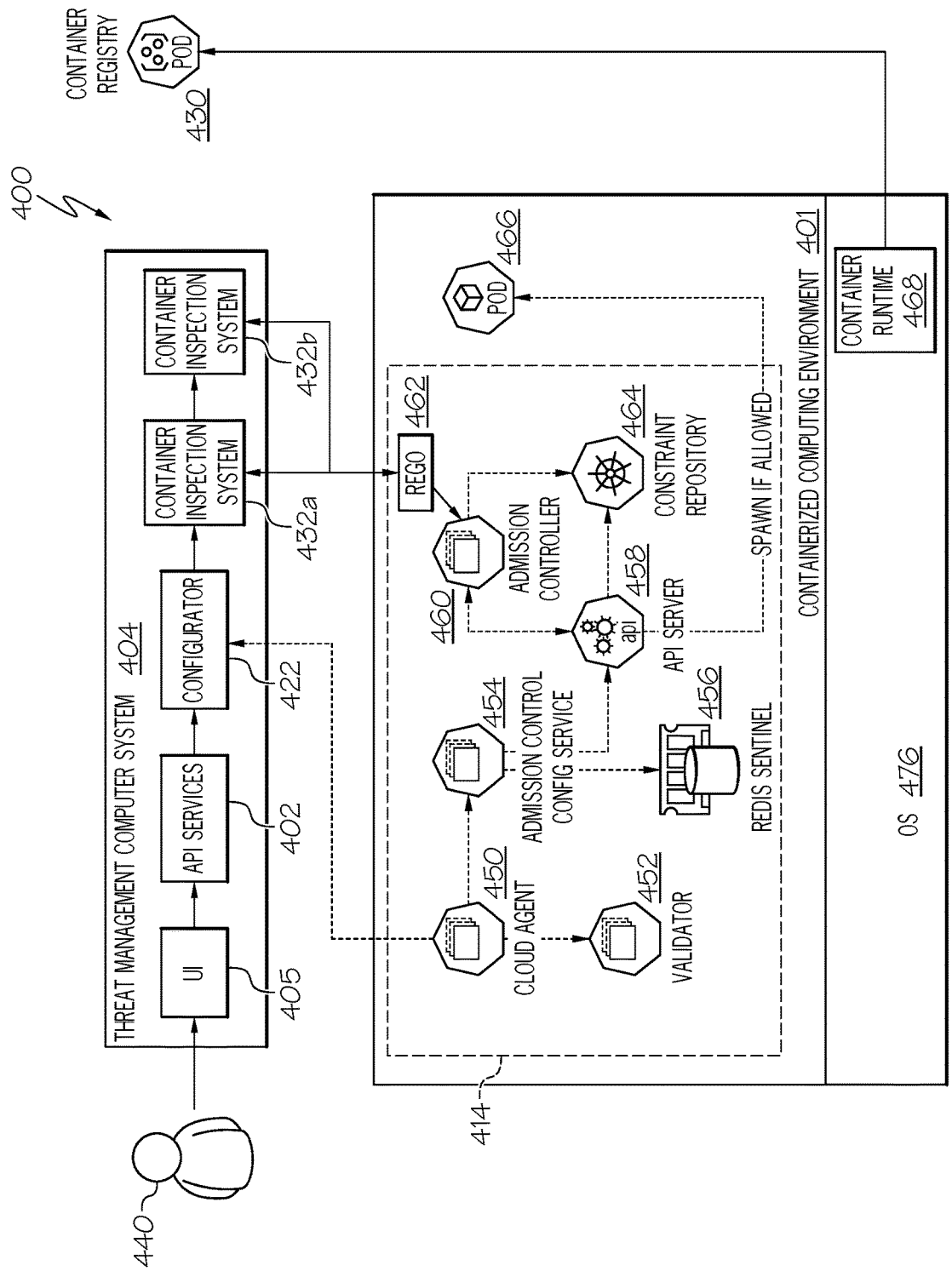
FIG. 4 depicts a block diagram of a containerized computing environment connected to a threat management computer system according to an example embodiment.

FIG. 4 depicts a block diagram of a container native firewall 400 having a containerized computing environment 401 connected to a threat management computer system 404 according to an example embodiment. The containerized computing environment 401 may contain some or all of the same features as the containerized computing environments 101, 301 described above. Likewise, the threat management computer system 404 may contain some or all of the same features as the threat management computer systems 104, 204, 304.

The threat management computer system 404 is shown including a UI system 405 (which may be the same or similar as the UI systems 205, 305), API services 402 (which may be the same or similar as the API services 202, 302), configuration module 422 (which may be the same or similar as configuration modules 122, 222, 322), as well as a first container inspection system 432a and a second container inspection system 432b.

The containerized computing environment 401 is shown running on an operating system 470 (e.g. Linux) having a container runtime element 468 connected to an external container registry 430. While the container registry 430 is shown as a third-party registry, the container registry 430 may be a container registry stored or otherwise contained within the threat management computer system 404. The container native firewall 400 may be connected to any number of container registries.

The containerized computing environment 401 includes a container protection system 414 that includes a plurality of interconnected application components which may be embodied by pods, clusters or otherwise contain containers for performing application processes described herein. In particular, the container protection system 414 includes a cloud agent 450, a validator 452, an admission control configuration service 454, a Redis sentinel 456, an API server 458, an admission controller 460 applying Rego rules 462, and a constraint repository 464. As shown, the containerized computing environment 401 is spawning a new pod 466. While only one new pod 466 is shown, the container protection system 414 may be configured to apply rules, policies, settings or the like to any number of created, spawned, added, or persisted pods and/or containers in an environment of any size and any number of clusters interconnected in any manner. The container protection system 414 may be configured to apply rules, policies, settings or the like in real time as a container creation request is received. In one embodiment, the container protection system 414 may comprise a processing cluster of containers having its own containerized namespace, while the newly spawned pod may include one or more containers that comprise another working namespace. The containerized computing environment 401 may include any number of namespaces.

The UI system 405 may provide for a user interface for interacting with the configuration module 422 for the purposes of creating, editing or deleting the rules, policies, settings, or constraints for the purpose of admission control, as described herein. The UI system 405 may allow for an administrator or user provide information to the configuration module 422 through the API services 402. The configuration module 422 may be configured to store the rules, policies, settings, or constraints related to container admission control, and communicate these rules to the cloud agent 450 of the container protection system 414. The rules sent to the cloud agent 450 may be in, for example, JavaScript Object Notation (JSON) format, and may be provided to the containerized computing environment 401 in a configuration changelog.

The cloud agent 450 may be configured to receive and process configuration changes, push notifications, or updates from the configuration module 422 and/or the threat management computer system 404. The cloud agent 450 may be configured to receive and process the changelog associated with these rule changes, push notifications, or updates. The changelog may be provided by the configuration module 422 and/or the threat management computer system 404 and used by the cloud agent 450 to validate a configuration with the validator 452. The validator 452 may be, for example, a YANG (Yet Another Next Generation) validator, whereby the configuration and/or changelog data (i.e. state data) uses a YANG modeling language. Once the validation is successful, the cloud agent 450 may further be in communication with the admission control configuration service 454 for providing the admission control configuration service 454 with the configuration information associated with these rule changes, push notifications, or updates.

The admission control configuration service 454 may be configured to receive configuration information associated with the rule changes, push notifications, or updates from the cloud agent 450. The admission control configuration service 454 may configured to store rules in a Redis sentinel for the purposes of failover and/or switchover replication. However, the admission control configuration service 454 may provide rules configurations to the API server 458 for the purposes of processing, creating and/or setting constraints associated with the rule changes, push notifications, or updates.

The API server 458 may be configured to process the rules received from the admission control configuration service 454. The API server 458 may be configured to create an admission constraint associated with the rule and/or rule update, stored at the constraint repository 464. The API server may further be configured to spawn, create, add a pod or container to the containerized computing environment 401.

The constraint repository 464 may store constraints associated with any rule, policies, settings, or constraints, or changes or updates thereto. Moreover, the constraint repository 464 may further store constraint templates that are packaged along with associated Helm charts, for initial installation when the Helm chart is initially installed during the registration sequence of a containerized computing environment, as described above and shown in FIG. 3.

A constraint template may be a custom resource definition rule provided to the constraint repository 464. A constraint template may describe both the Rego rules which enforces the constraint and the schema of the constraint. The schema of the constraint may allow the administrator 440 of the threat management computer system 404 to fine-tune the behavior of the constraint, or specifically define the values that must be provided in order to trigger the application of the constraint. Constraint schema may be provided by the administrator 440 as a change or update to the rules, as described above. The constraint repository 464 may also include more particular rules or constraints for providing when an administrator wants a constraint template enforced, and how. Particular rules or constraints may pertain to any type of determinable parameter, metric or quality of a container or a container scan, including a vulnerability quality or metric, a location, a namespace, a group of the container, a repository from where the container originated, a cleanliness of the code of the container image, a number of bugs found, a testing code coverage metric, or any information received from container inspection systems, such as the container inspection systems 432a, 432b.

The admission controller 460 may be configured to receive information from the container inspection systems 432a, 432b. In the case that the containerized computing environment is a Kubernetes environment, the admission controller 460 may be, for example, an OPA gatekeeper system. The admission controller 460 may be in communication with the constraint repository 464 for the purpose of applying the constraints that relate to a given container and/or pod during creation, add, and/or spawn. The admission controller 460 may further be in communication with one or more container inspection systems, such as the container inspection systems 432a, 432b, for receiving information associated with container image scans or inspections performed and using that information to apply the constraints that are applicable to a given container, pod or the like which is being added, created or spawned.

The container inspection systems 432a, 432b may be a container image scanning system which can scan a container for security threats and operating system vulnerabilities and identify such issues, as well as identify newer version of a container image relative to the container or image being scanned, where the newer version may include fixes to identified issues. The container inspection systems 432a, 432b may include the ability to identify exploitable weak points in container images and help prevent security breaches of containers deployed or created from scanned container images. The container inspection systems 432a, 432b may include the ability to allow an administrator to create compliance policy rules for determining when a container may have a security issue. Thus, the container inspection system 432a, 432b may be able to apply any type of rules, customizable by an administrator at the threat management computer system 404, for determining whether a container image that is scanned has an identified security issue.

Container inspection systems may include, for example, Sophos® Cloud Optix™, or other container inspection systems, such as Black Duck or SonarQube. The container inspection systems 432a, 432b may represent two such systems, which each provide information to the admission controller 460 for applying the Rego rules 462. While the embodiment shown includes two systems providing information, it should be understood the container native firewall 400 may deploy a single container inspection system, or may deploy any number of container inspection systems, each providing information to the admission controller 460 which may be used for the application and/or implementation in Rego language rules. Moreover, while the embodiment shown includes the two container inspection systems 432a, 432b within the threat management computer system 404, other embodiments may utilize external or third-party container inspection systems.

Thus, the admission controller 460 may be an opensource software system (OSS) such as an OPA gatekeeper that provides functionality for enforcing admission control policies that can be written using the OPA Rego language. The admission controller 460 may thus extend the constraints framework stored in the constraint repository 464 and applies these relevant or applicable constraints using custom resource definitions (CRDs) called constraints and constraint templates stored in the constraint repository 464. The admission controller 460 may apply constraints applicable, based on the information received by the container inspection systems 432a, 432b, in determining whether to allow or disallow the created from being created, spawned, or added to the containerized computing environment 401.

Figure 5:
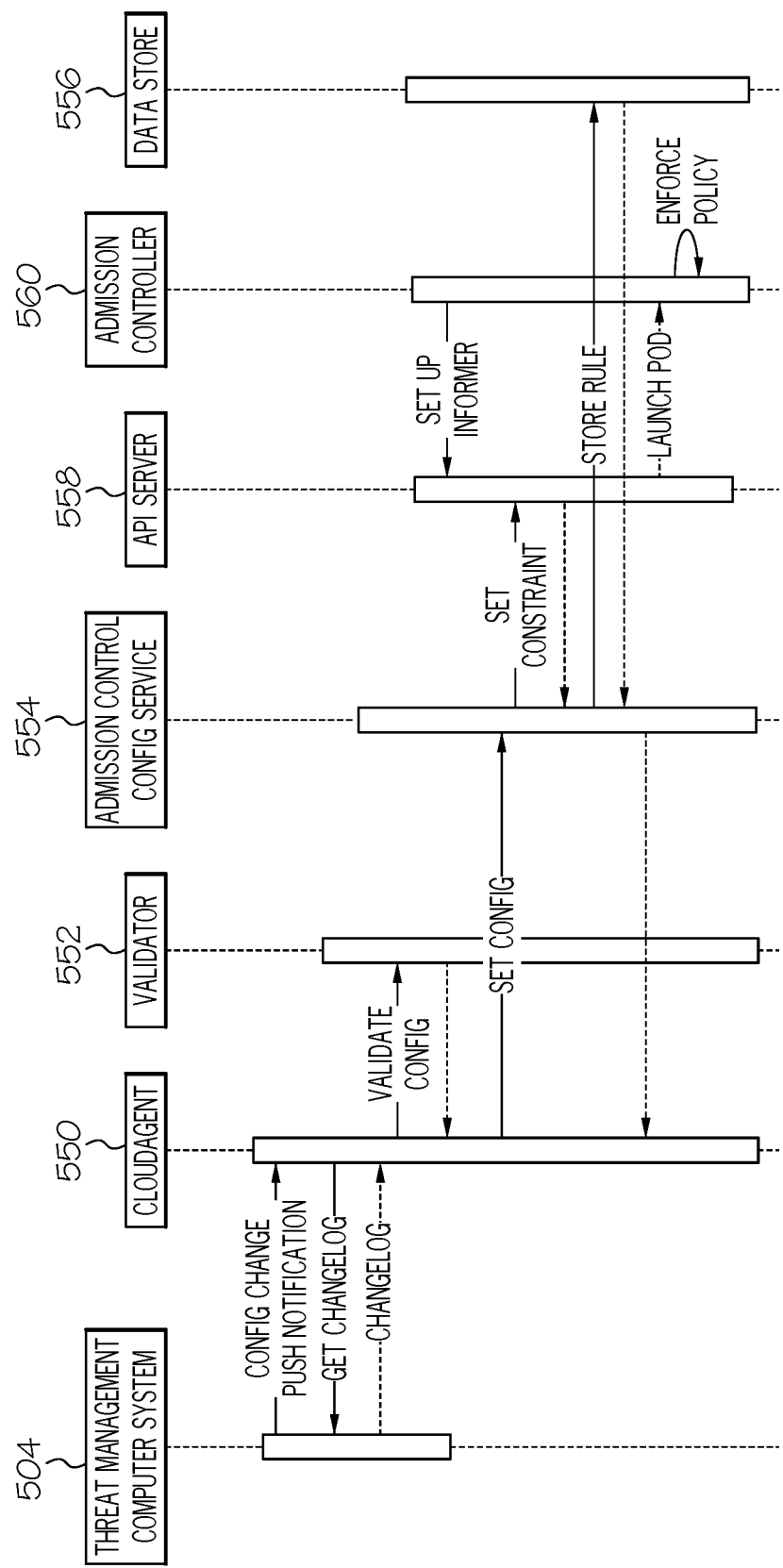
FIG. 5 depicts an admission control configuration sequence according to an example embodiment.

FIG. 5 depicts an admission control configuration sequence 500 according to an example embodiment. As shown, the sequence 500 includes admission control steps that are performable by various features of a container native firewall system having a containerized computing environment, such as a Kubernetes cluster (such as the containerized computing environments 101, 401), connected to a threat management computer system 504 (such as the threat management computer systems 104, 204, 304, 404). The admission control configuration sequence 500 further includes a cloud agent 550 (such as the cloud agent 450), a validator 552 (such as the validator 452), an admission control configuration service 554 (such as the admission control configuration service 454), an API server 558 (such as API server 458), an admission controller 460 (such as the admission controller 460) and a data store 556 (such as a data store of the Redis sentinel 456). While the data store 556 may be a part of a Redis sentinel, other embodiments could use other data storages or databases, such as MySQL or Postgres.

As shown in the admission control configuration sequence 500, the threat management computer system 504 first provides a configuration change, for example in the form of a push notification, to the cloud agent 550 of the containerized computing environment. The cloud agent 550 further receives a changelog with the configuration change from the threat management computer system 504.

Next, the cloud agent 550 validates the configuration and/or configuration changelog through the validator 552. Once validated, the cloud agent 550 next sets the configuration with the admission control configuration service 554. The admission control configuration service 554 then sets the constraint with the API service and stores the rule with the data store 556, which is confirmed by data store 556.

Prior to attempting of the launching of a pod or container, the admission controller 560 sets up an informer with the API server 558 to watch for any attempt by the API server 558 to launch, add, create or spawn a pod or container in the containerized computing environment. When the admission controller 560 senses that a pod is being launched, the gatekeeper 560 then will enforce the constraint set by the admission control configuration service 554 in the API server 558, if the constraint is applicable. While not shown, the API server 558 and/or the admission controller 560 may further be connected to a constraint repository which includes stored constraint templates and constraints.

Figure 6:
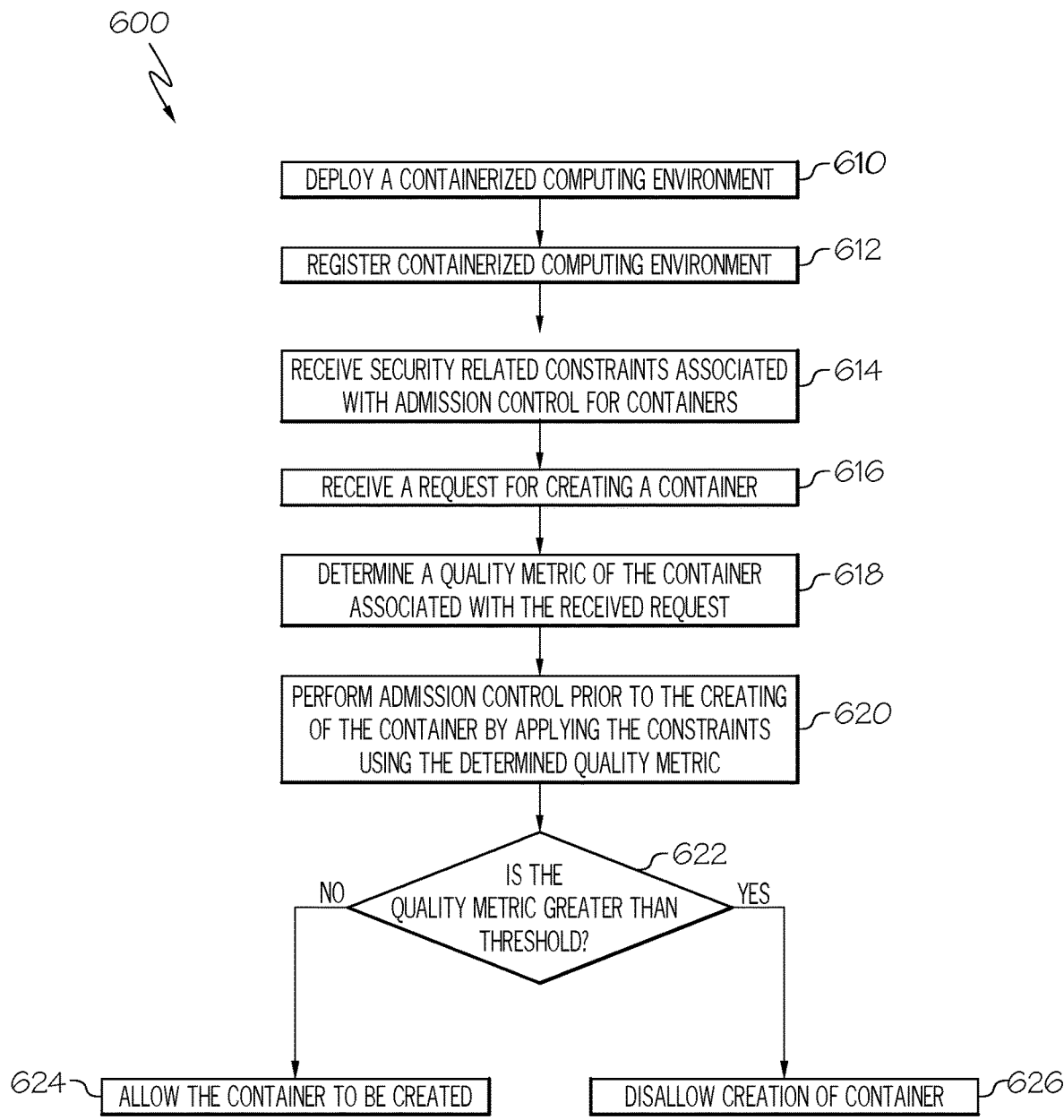
FIG. 6 depicts a method for performing admission control in a containerized computing environment according to an example embodiment.

FIG. 6 depicts a method 600 for performing admission control in a containerized computing environment according to an example embodiment. The method 600 includes a first step 610 of deploying a containerized computing environment, such as one of the containerized computing environments 101, 301, 401 described herein. The containerized computing environment may be deployed with any number of namespaces, and may deployed at an enterprise facility that is connected to a cloud-based threat management computer system, such as one of the threat management computer systems 104, 204, 304, 404, 504. The containerized computing environment may include an admission controller having a gatekeeper or admission controller configured to enforce rules, constraints, policies, constraint templates, and the like related to quality or security metrics of containers, pods or the like being added to the containerized computing environment.

The method 600 includes a next step 612 of registering the deployed containerized computing environment with the threat management system. For example, the registering may be conducted in accordance with the registration sequence shown in FIG. 3. Registration of the containerized computing environment may allow the threat management system, and an administrator thereof, to provide rules, policies, constraints, or configurations and/or updates thereof to an admissions controller of the containerized computing environment.

The method 600 includes a next step 614 of receiving security related constraints associated with admission control for containers. The constraints may be rules, policies, configurations or updates thereof, and may be provided, for example, by a configuration module of the threat management computer system and received by a cloud agent (such as the cloud agent 450) of an admission controller (such as the admission controller 460), as described above. The constraints may include or comprise a constraint template having a custom resource definition rule provided to the admission controller. A constraint template may describe both the Rego rules which enforces the constraint and the schema of the constraint, as described above. The constraints may be parameters associated with which container namespaces the constraints apply to. The constraints may be related to authorized or unauthorized image repository locations. The constraints may be related to levels of vulnerability with a scan of the container image using a container inspection system. Thus, the constraints may relate to the rules which apply any known or determinable metric of a container or pod, where the rules determine whether or not a container having that known or determinable metric should be allowed or disallowed to be created by the admission controller.

The method 600 includes a next step 616 of receiving a request for creating, adding, spawning or otherwise making a container or pod in the containerized computing environment. This request may come from an API server of the containerized computing environment and/or an admission controller thereof.

The method 600 then includes a step 618 of determining a quality metric of the container associated with the received request for creating the container. The quality metric may relate to a security vulnerability associated with the container or a container image associated with the container. The quality metric may further include metrics related to testing code coverage, a number of bugs, a cleanliness metric of the container code, a location metric or address of a repository within which the container image is from, or a security vulnerability metric. Any type of quality metric is contemplated. A methodology for determining a quality metric is more particularly shown in FIG. 8 and described below. The quality metric may be characterized as a quality score associated with the container. The quality metric may be provided by a container inspection system, such as one or both of the first container inspection system 432*a* and a second container inspection system 432*b* shown in FIG. 4. In some embodiment, the container inspection systems provide many quality metrics accounting for many different types of parameters, which may be analyzed according to rules or constraints. The quality metric may either be directly provided information from the container inspection system or may be a metric determined by the admission controller based on the information provided by the container inspection system.

The method 600 then includes a step 620 of performing admission control prior to the creating of the container by applying the constraints using the determined quality metric. This step 620 may be provided by, for example, an admission controller, such as the admission controller 460, using Rego rules which enforces the constraint and the schema of the constraint, as described above.

The method 600 then includes a decision diamond step 622 of determining whether the quality metric is greater than a threshold. In this exemplary embodiment, the quality metric may represent a particular quality score which may relate to a number of vulnerabilities associated with the container being added, created, spawned or otherwise made. The gatekeeper and/or admission controller may determine that the quality metric is zero if the container has no known vulnerabilities. In this case, quality metric would not be greater than a threshold, and the method 600 proceeds to the final step 624 of allowing the container to be created, added, spawned or otherwise made in the containerized computing environment. Alternatively, the gatekeeper and/or admission controller may determine that the quality metric is greater than a threshold. The threshold may be anything greater than zero (i.e. 1) or the threshold could be higher. If the gatekeeper and/or admission controller determines that the quality metric is greater than the threshold, the method 600 proceeds to the final step 626 of disallowing the container to be created, added, spawned or otherwise made in the containerized computing environment.

In accordance with the method 600, the admission controller and/or gatekeeper may thus be configured to enforce the rules or constraints provided by the threat management facility. The gatekeeper and/or admission controller may thus be in communication with a container inspection system used in determining quality metrics or providing security information related to the container to the gatekeeper and/or admission controller during the enforcing the rules or constraints. While not shown, the method 600 may include fetching, by the admission controller using a remote procedure call mechanism by invoking one or more application programing interfaces (APIs), such as a representational state transfer (REST) API or any other protocol through which APIs can be invoked, inspection information related to the container that may be usable in determining the quality metric or quality score of the container.

While the quality metric threshold may be one example embodiment for how a constraint template may be deployed, other embodiments may exist. For example, other constraint templates may have other constraints unrelated to a quality metric being greater than a threshold. For example, the quality metric may be the fact that a container comes from an unsanctioned repository, which would result in the gatekeeper and/or admission controller to disallow the creation of the container. The quality metric may be that the container includes a critical error, not be authorized for a particular namespace that is attempting to create the container, or any other potential condition which could be set by an administrator related to the overall security of the container, the containerized computing environment and/or the client, customer or enterprise facility that is being overseen by the threat management computer system.

Figure 7:
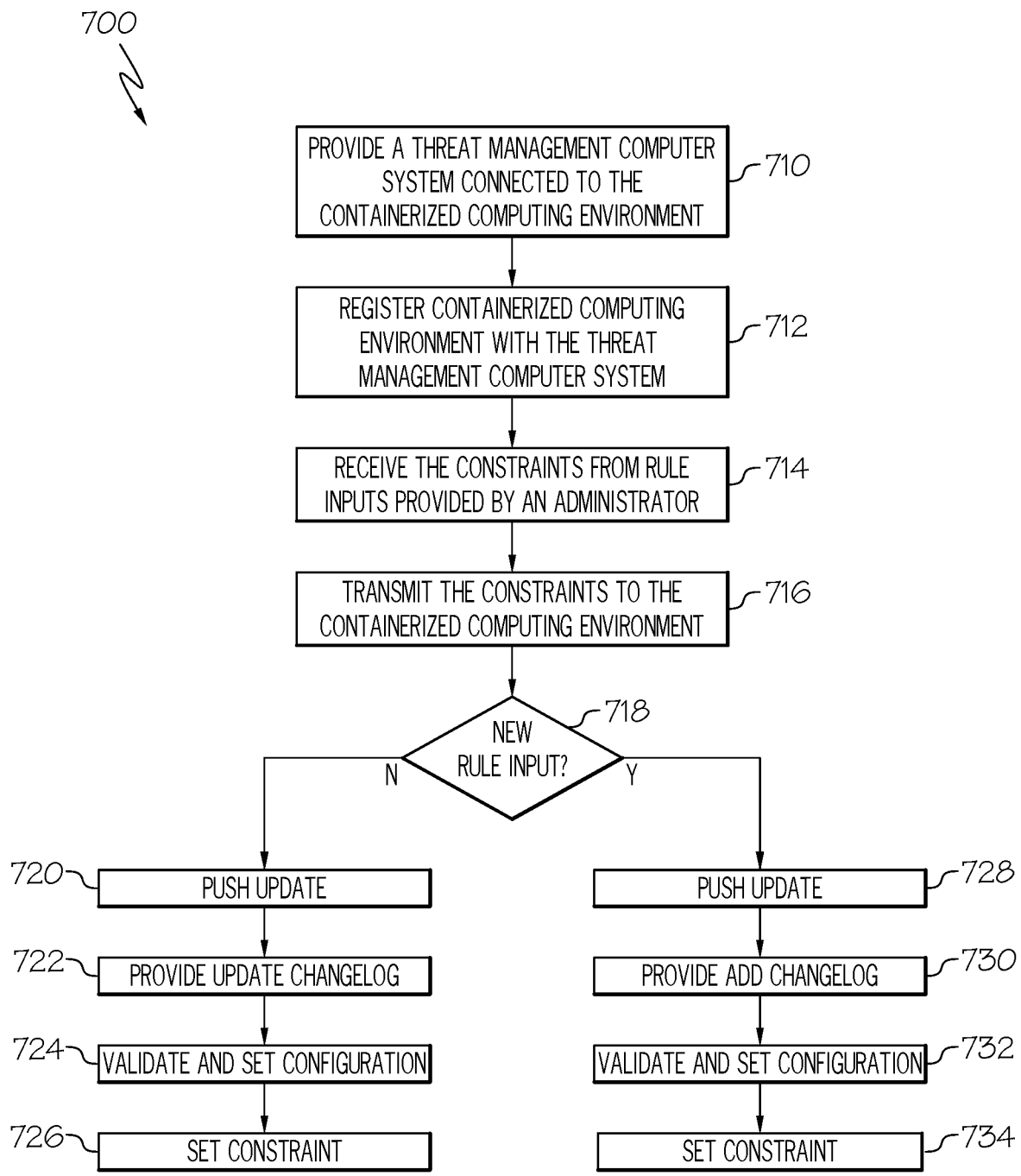
FIG. 7 depicts a method of providing constraints by a threat management system according to an example embodiment.

FIG. 7 depicts a method 700 of providing constraints by a threat management system according to an example embodiment. The method 700 may be combined as part of the method 600, in facilitating the performing of admission control in a containerized computing environment. The method 700 includes a first step 710 of providing a threat management computer system, such as one of the threat management computer systems 104, 204, 304, 404, 504, connected to a containerized computing environment, such as one of the containerized computing environments 101, 301, 401 described herein.

The method 700 includes a step 712 of registering the containerized computing environment with the threat management computer system. For example, the registering may be conducted in accordance with the registration sequence shown in FIG. 3. Registration of the containerized computing environment may allow the threat management computer system, and an administrator thereof, to provide rules, policies, constraints, or configurations and/or updates thereof to an admissions controller of the containerized computing environment.

The method 700 includes a step 714 of receiving constraints, rules, policies or configurations from inputs provided by an administrator. The administrator may provide these inputs through a UI, such as the UI system 205, 305, 405, which may be processed by an API services and then provided to a configuration module, such as the configuration module 122, 222, 322, 422, of the threat management system. The method 700 then includes a step 716 of transmitting the input constraints from the threat management computer system to the containerized computing environment. For example, the step 714 may be provided by transmitting by the configuration module to a cloud agent of the containerized computing environment, such as the cloud agent 450, 550.

The method 700 includes a step 718 of determining, by for example an admission controller of the containerized computing environment, whether a rule provided by the threat management facility is new. If a rule is determined to not be a new rule, but rather a change to an existing rule, the method 700 includes the step 720 of pushing a rule update through the cloud agent, then through an admission control configuration service, such as the admission control configuration service 454, 554, to an API server, such as API server 458, 558, and then into a constraint repository, such as the constraint repository 464, along with a step 722 of providing an UPDATE change log. The method 700 then proceeds to validating and setting a configuration at a step 724, which may be accomplished by the cloud agent interacting with a validator, such as the validator 452, 552, and then interacting with an admission control configuration interface. Finally, the method 700 proceeds to a step 726 of setting the constraint by the admission control configuration service interacting with the API server.

If a rule is determined to be a new rule, the method 700 includes the step 728 of pushing a rule update through the cloud agent, then through an admission control configuration service, to an API server, and then into a constraint repository, along with a step 730 of providing an ADD change log. The method may then include a step 732 of validating and setting a configuration, which may be accomplished by the cloud agent interacting with a validator and then interacting with an admission control configuration interface. Finally the method 700 proceeds to a step 734 of setting the constraint by the admission control configuration service interacting with the API server.

Figure 8:
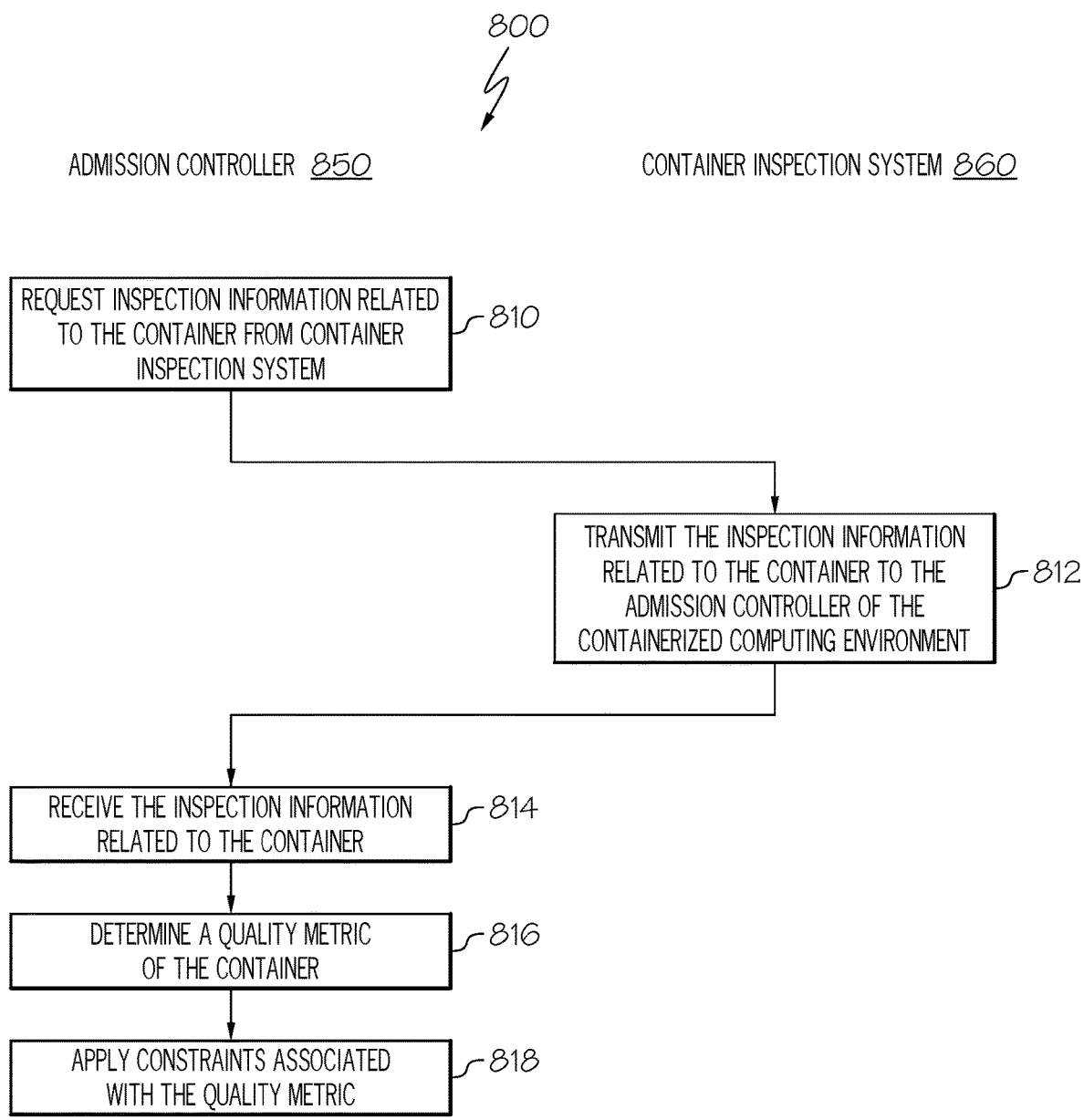
FIG. 8 depicts a method of determining a quality metric of the container associated with the received request according to an example embodiment.

FIG. 8 depicts a method 800 of determining a quality metric of the container associated with the received request according to an example embodiment. Like the method 700, the method 800 may be included as a portion of the method 600 for performing admission control in a containerized computing environment. The method 800 includes a first step 810, performable by an admission controller 850, of requesting inspection information related to a container attempting to be added to a containerized computing environment from a container inspection system 860 (which may represent one of the container inspection systems 432*a*, 432*b* described above and shown in FIG. 4). The method 800 includes a second step 812, performable by the container inspection system 860 of transmitting the inspection information related to the container to the admission controller 850 of the containerized computing environment. The method 800 includes a next step 814 of receiving, by the admission controller 850, the inspection information related to the container. The method 800 then includes a step 816 of determining a number of security vulnerabilities from the received inspection information, by the admission controller 850. Finally, the method 800 includes determining a quality metric of the container 818 based on the number of security vulnerabilities.

In some embodiments of the method 800, the container inspection system 860 could include a plurality of container inspection systems. Moreover, the inspection information may include information generated by each of the plurality of container inspection systems, and the constraints may include rules associated with the inspection information associated with each of the plurality of container inspection systems.

Overall, the method 800 may be performed using a gatekeeper admission controller of the containerized computing environment. The method 800 may be performed during the admissions process of a container, whereby the admission controller fetches information related to a container image or container associated with the container or pod being added, spawned, created or made for the containerized computing environment.

Steps of the methods described herein are meant to be exemplary, and may be performable by computer systems such as those described herein. While three separate methods 600, 700, 800 are shown, steps for these methods may be combined into a single method using any combination of method steps described.

The foregoing systems, devices, and methods thereby provide a mechanism by which a threat management facility may use security metrics and/or quality scores or metrics for admissions control in containerized computing environments for determining whether to allow or disallow the creation, addition, making or spawning of new containers and/or pods. The described technologies may be particularly useful in allowing an administrator of a containerized computing environment to ensure that the container images that are downloaded and installed or added to a containerized computing environment to meet the security policies. Further, the described technologies can ensure that container images being used to add pods or containers to a containerized computing environment are from a list of allowed repositories for a namespace and any images that are not from allowed repositories are not installed on the K8s cluster. Still further, the described technologies can ensure that the container images which do have vulnerabilities belonging to a list of categories that considered harmful as per the security policies for a specified namespace are not allowed. Thus, the systems described provide for an administrator in a threat management system managing a containerized computing environment from the cloud to set specific policies and conditions under which a container can be installed in a containerized computing environment (e.g. cluster). Systems described are deployable in a desirable architecture in which updates can be regularly provided to an admission controller, and so that an admission controller can take into account any type of container and/or container image metrics which are determinable by one or more connected container inspection systems.

Figure 9:
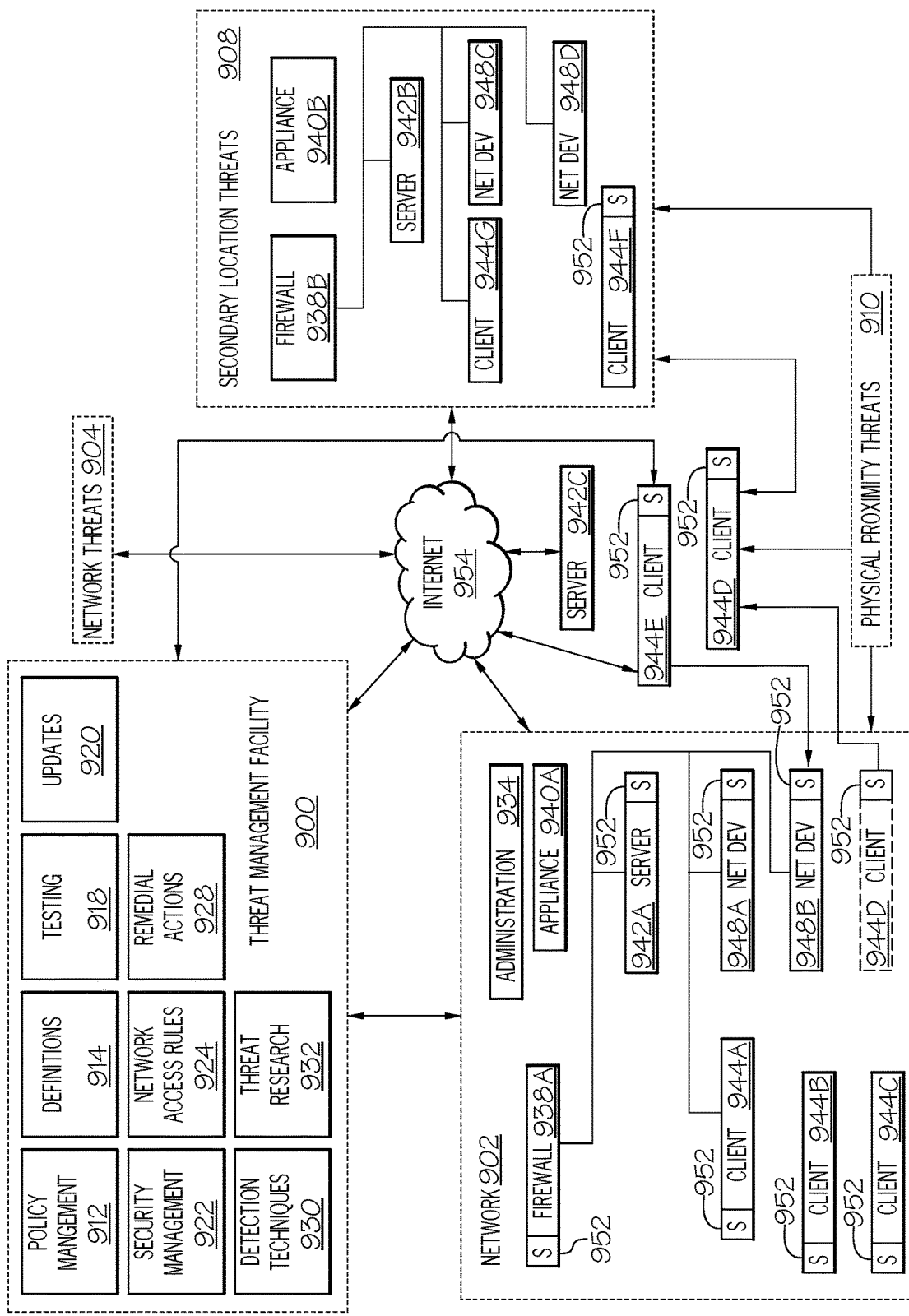
FIG. 9 illustrates an environment for threat management according to an example embodiment.

FIG. 9 illustrates an environment for threat management. Specifically, FIG. 9 depicts a block diagram of a threat management facility 900 providing protection to one or more enterprises, networks, locations, users, businesses, etc. against a variety of threats—a context in which the techniques described above may usefully be deployed. The threat management facility 900 may be used to protect devices and assets (e.g., IoT devices or other devices) from computer-generated and human-generated threats. For example, a corporation, school, web site, homeowner, network administrator, or other entity may institute and enforce one or more policies that control or prevents certain network users (e.g., employees, residents, users, guests, etc.) from accessing certain types of applications, devices, resources generally or in a particular manner. Policies may be created, deployed and managed, for example, through the threat management facility 900, which may update and monitor network devices, users, and assets accordingly. The threat management facility 900 may describe various functions of any of the threat management computer systems 104, 204, 304, 404, 504 described herein.

The threat of malware or other compromises may be present at various points within a network 902 such as laptops, desktops, servers, gateways, communication ports, handheld or mobile devices, IoT devices, firewalls. In addition to controlling or stopping malicious code, a threat management facility 900 may provide policy management to control devices, applications, or users that might otherwise undermine productivity and network performance within the network 902. The network 902 may be representative of any of the client, customer or enterprise facility described above, and may include various devices and/or hardware necessary to create the containerized computing environments 101, 301, 401 described herein.

The threat management facility 900 may provide protection to network 902 from computer-based malware, including viruses, spyware, adware, Trojans, intrusion, spam, policy abuse, advanced persistent threats, uncontrolled access, and the like. In general, the network 902 may be any networked computer-based infrastructure or the like managed by a threat management facility 902, such as an organization, association, institution, or the like, or a cloud-based facility that is available for subscription by individuals. For example, the network 902 may be a corporate, commercial, educational, governmental, or other network 902, and may include multiple networks, computing resources, and other facilities, may be distributed among more than one geographical locations, and may include administration 934, a firewall 938A, an appliance 940A, a server 942A, network devices 948A-B, clients 944A-D, such as IoT devices or other devices. It will be understood that any reference herein to a client or client facilities may include the clients 944A-D shown in FIG. 9 and vice-versa.

The threat management facility 900 may include computers, software, or other computing facilities supporting a plurality of functions, such as security management facility 922, policy management facility 912, update facility 920, a definitions facility 914, network access rules facility 924, remedial action facility 928, detection techniques facility 930, testing facility 918, a threat research facility 932, and the like. In embodiments, the threat protection provided by the threat management facility 900 may extend beyond the network boundaries of the network 902 to include clients 944D (or client facilities) that have moved into network connectivity not directly associated with or controlled by the network 902. Threats to client facilities may come from a variety of sources, such as from network threats 904, physical proximity threats 910, secondary location threats 908, and the like. Clients 944A-D may be protected from threats even when the client 944A-D is not directly connected or in association with the network 902, such as when a client 944E-F moves in and out of the network 902, for example when interfacing with an unprotected server 942C through the Internet 954, when a client 944F is moving into a secondary location threat 908 network such as interfacing with components 940B, 942B, 948C, 948D that are not protected, and the like.

The threat management facility 900 may use or may be included in an integrated system approach to provide network 902 protection from a plurality of threats to device resources in a plurality of locations and network configurations. The threat management facility 900 may also or instead be deployed as a stand-alone solution. For example, some or all of the threat management facility 900 components may be integrated into a server or servers at a remote location, for example in a cloud computing facility. For example, some or all of the threat management facility 900 components may be integrated into a firewall, gateway, or access point within or at the border of the network 902. In some embodiments, the threat management facility 900 may be integrated into a product, such as a third-party product, e.g., through an application programming interface, which may be deployed on endpoints, on remote servers, on internal servers or gateways for a network, or some combination of these.

The security management facility 922 may include a plurality of elements that provide protection from malware to network 902 device resources in a variety of ways including endpoint security and control, email security and control, web security and control, reputation-based filtering, control of unauthorized users, control of guest and non-compliant computers, and the like. The security management facility 922 may include a local software application that provides protection to one or more network 902 devices. The security management facility 922 may have the ability to scan client facility files for malicious code, remove or quarantine certain applications and files, prevent certain actions, perform remedial actions and perform other security measures. This may include scanning some or all of the files stored on the client facility or accessed by the client facility on a periodic basis, scanning an application when the application is executed, scanning data (e.g., files or other communication) in transit to or from a device, etc. The scanning of applications and files may be performed to detect known or unknown malicious code or unwanted applications.

The security management facility 922 may provide email security and control. The security management facility 922 may also or instead provide for web security and control, such as by helping to detect or block viruses, spyware, malware, unwanted applications, and the like, or by helping to control web browsing activity originating from client devices. In an embodiment, the security management facility 922 may provide for network access control, which may provide control over network connections. In addition, network access control may control access to virtual private networks (VPN) that provide communications networks tunneled through other networks. The security management facility 922 may provide host intrusion prevention through behavioral based protection, which may guard against known or unknown threats by analyzing behavior before or while code executes. The security management facility 622 may provide reputation filtering, which may target or identify sources of code.

In general, the security management facility 922 may support overall security of the network 902 using the various techniques described above, optionally as supplemented by updates of malicious code information and so forth for distribution across the network 902.

The administration facility 934 may provide control over the security management facility 922 when updates are performed. Information from the security management facility 922 may also be sent from the enterprise back to a third party, a vendor, or the like, which may lead to improved performance of the threat management facility 900.

The threat management facility 900 may include a policy management facility 912 configured to take actions, such as to block applications, users, communications, devices, and so on based on determinations made. The policy management facility 912 may employ a set of rules or policies that determine network 902 access permissions for a client 944. In an embodiment, a policy database may include a block list, a blacklist, an allowed list, a whitelist, or the like, or combinations of the foregoing, which may provide a list of resources internal or external to the network 902 that may or may not be accessed by client devices 944. The policy management facility 912 may also or instead include rule-based filtering of access requests or resource requests, or other suitable techniques for controlling access to resources consistent with a corresponding policy.

The policy management facility 912 may also or instead provide configuration policies to be used to compare and control the configuration of applications, operating systems, hardware, devices, network associated with the network 902. An evolving threat environment may dictate timely updates, and thus an update management facility 920 may also be provided by the threat management facility 900. In addition, a policy management facility 912 may require update management (e.g., as provided by the update facility 920 herein described). In embodiments, the update management facility 920 may provide for patch management or other software updating, version control, and so forth.

The security facility 922 and policy management facility 912 may push information to the network 902 and/or a given client 944. The network 902 and/or client 944 may also or instead request information from the security facility 922 and/or policy management facility 912, network server facilities 942, or there may be a combination of pushing and pulling of information. In an embodiment, the policy management facility 912 and the security facility 922 management update modules may work in concert to provide information to the network 902 and/or client 944 facility for control of applications, devices, users, and so on.

As threats are identified and characterized, the threat management facility 900 may create updates that may be used to allow the threat management facility 900 to detect and remediate malicious software, unwanted applications, configuration and policy changes, and the like. The threat definition facility 914 may contain threat identification updates, also referred to as definition files. A definition file may be a virus identity file that may include definitions of known or potential malicious code. The virus identity definition files may provide information that may identify malicious code within files, applications, or the like. The definition files may be accessed by security management facility 922 when scanning files or applications within the client facility for the determination of malicious code that may be within the file or application. A definition management facility may include a definition for a neural network or other recognition engine. A definition management facility 914 may provide timely updates of definition files information to the network, client facilities, and the like.

The security management facility 922 may be used to scan an outgoing file and verify that the outgoing file is permitted to be transmitted per the enterprise facility 902 rules and policies. By checking outgoing files, the security management facility 922 may be able to discover malicious code infected files that were not detected as incoming files.

The threat management facility 900 may provide controlled access to the network 902. A network access rules facility 924 may be responsible for determining if a client facility 944 application should be granted access to a requested network resource. In an embodiment, the network access rules facility 924 may verify access rights for client facilities 944 to or from the network 902 or may verify access rights of computer facilities to or from external networks. When network access for a client facility is denied, the network access rules facility 924 may send an information file to the client facility, e.g., a command or command file that the remedial action facility 928 may access and take action upon. The network access rules facility 924 may include one or more databases that may include a block list, a blacklist, an allowed list, a whitelist, a reputation list, an unacceptable network resource database, an acceptable network resource database, a network resource reputation database, or the like. The network access rules facility 924 may incorporate rule evaluation. Rule evaluation may, for example, parse network access requests and apply the parsed information to network access rules. The network access rule facility 924 may also or instead provide updated rules and policies to the enterprise facility 902.

When a threat or policy violation is detected by the threat management facility 900, the threat management facility 900 may perform or initiate remedial action through a remedial action facility 928. Remedial action may take a variety of forms, such as terminating or modifying an ongoing process or interaction, issuing an alert, sending a warning to a client or administration facility 934 of an ongoing process or interaction, executing a program or application to remediate against a threat or violation, record interactions for subsequent evaluation, and so forth. The remedial action may include one or more of blocking some or all requests to a network location or resource, performing a malicious code scan on a device or application, performing a malicious code scan on the client facility 944, quarantining a related application (or files, processes or the like), terminating the application or device, isolating the application or device, moving a process or application code to a sandbox for evaluation, isolating the client facility 944 to a location or status within the network that restricts network access, blocking a network access port from a client facility 944, reporting the application to an administration facility 934, or the like, as well as any combination of the foregoing.

Remedial action may be provided as a result of a detection of a threat or violation. The detection techniques facility 930 may include tools for monitoring the network or managed devices within the network 902. The detection techniques facility 930 may provide functions such as monitoring activity and stored files on computing facilities. Detection techniques, such as scanning a computer's stored files, may provide the capability of checking files for stored threats, either in the active or passive state. Detection techniques such as streaming file management may be used to check files received at the network, a gateway facility, a client facility, and the like.

Verifying that the threat management facility 900 detects threats and violations to established policy, may require the ability to test the system, either at the system level or for a particular computing component. The testing facility 918 may allow the administration facility 934 to coordinate the testing of the security configurations of client facility computing facilities on a network. For example, the administration facility 934 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 934. The administration facility 934 may be able to determine the level of preparedness of the client facility 944 based on the reported information. Remedial action may be taken for any of the client facilities 944 as determined by the administration facility 934.

The threat management facility 900 may provide threat protection across the network 902 to devices such as clients 944, a server facility 942, an administration facility 934, a firewall 938, a gateway, one or more network devices (e.g., hubs and routers 948, a threat management or other appliance 940, any number of desktop or mobile users, and the like. As used herein the term endpoint may refer to any compute instance running on a device that can source data, receive data, evaluate data, buffer data, process data or the like (such as a user's desktop computer, laptop, IoT device, server, etc.). This may, for example, include any client devices as well as other network devices and the like within the network 902, such as a firewall or gateway (as a data evaluation endpoint computer system), a laptop (as a mobile endpoint computer), a tablet (as a hand-held endpoint computer), a mobile phone, or the like. The term endpoint may also or instead refer to any final or intermediate source or destination for data within a network 902. The endpoint computer security facility 952 may be an application locally loaded onto any corresponding computer platform or computer support component, either for local security functions or for management by the threat management facility 900 or other remote resource, or any combination of these.

The network 902 may include a plurality of client facility computing platforms on which the endpoint computer security facility 952 is installed. A client facility computing platform may be a computer system that is able to access a service on another computer, such as a server facility 942, via a network. The endpoint computer security facility 952 may, in corresponding fashion, provide security in any suitable context such as among a plurality of networked applications, for a client facility connecting to an application server facility 942, for a web browser client facility connecting to a web server facility 942, for an e-mail client facility retrieving e-mail from an Internet 954 service provider's mail storage servers 942 or web site, and the like, as well as any variations or combinations of the foregoing.

The network 902 may include one or more of a variety of server facilities 942, such as application servers, communications servers, file servers, database servers, proxy servers, mail servers, fax servers, game servers, web servers, and the like. A server facility 942, which may also be referred to as a server facility 942 application, server facility 942 operating system, server facility 942 computer, or the like, may be any device(s), application program(s), operating system(s), or combination of the foregoing that accepts client facility connections in order to service requests from clients 944. In embodiments, the threat management facility 900 may provide threat protection to server facilities 942 within the network 902 as load conditions and application changes are made.

A server facility 942 may include an appliance facility 940, where the appliance facility 940 provides specific services to other devices on the network. Simple server facility 942 appliances may also be utilized across the network 902 infrastructure, such as switches, routers, hubs, gateways, print servers, modems, and the like. These appliances may provide interconnection services within the network 902, and therefore may advance the spread of a threat if not properly protected.

A client facility 944 may be protected from threats from within the network 902 using a local or personal firewall, which may be a hardware firewall, software firewall, or combination, that controls network traffic to and from a client. The local firewall may permit or deny communications based on a security policy. Another component that may be protected by an endpoint computer security facility 952 is a network firewall facility 938, which may include hardware or software, in a standalone device or integrated with another network component, which may be configured to permit, deny, or proxy data through a network 902.

The interface between the threat management facility 900 and the network 902, and through the appliance facility 940 to embedded endpoint computer security facilities, may include a set of tools that may be the same or different for various implementations, and may allow each network administrator to implement custom controls. In embodiments, these controls may include both automatic actions and managed actions. The administration facility 934 may configure policy rules that determine interactions. The administration facility 934 may also establish license management, which in turn may further determine interactions associated with licensed applications. In embodiments, interactions between the threat management facility 900 and the network 902 may provide threat protection to the network 902 by managing the flow of network data into and out of the network 902 through automatic actions that may be configured by the threat management facility 900 for example by action or configuration of the administration facility 934.

Client facilities 944 within the network 902 may be connected to the network 902 by way of wired network facilities 948A or wireless network facilities 948B. Mobile wireless facility clients 944, because of their ability to connect to a wireless network access point, may connect to the Internet 954 outside the physical boundary of the network 902, and therefore outside the threat-protected environment of the network 902. Such a client 944, if not for the presence of a locally installed endpoint computer security facility 952, may be exposed to a malware attack or perform actions counter to network 902 policies. Thus, the endpoint computer security facility 952 may provide local protection against various threats and policy violations. The threat management facility 900 may also or instead be configured to protect the out-of-enterprise facility 902 mobile client facility (e.g., the clients 944) through interactions over the Internet 954 (or other network) with the locally-installed endpoint computer security facility 952. Thus, mobile client facilities that are components of the network 902 but temporarily outside connectivity with the network 902 may be provided with the threat protection and policy control the same as or similar to client facilities 944 inside the network 902. In addition, mobile client facilities 944 may receive the same interactions to and from the threat management facility 900 as client facilities 944 inside the enterprise facility 902, such as by receiving the same or equivalent services via an embedded endpoint computer security facility 952.

Interactions between the threat management facility 900 and the components of the network 902, including mobile client facility extensions of the network 902, may ultimately be connected through the Internet 954 or any other network or combination of networks. Security-related or policy-related downloads and upgrades to the network 902 may be passed from the threat management facility 900 through to components of the network 902 equipped with the endpoint computer security facility 952. In turn, the endpoint computer security facility 952 components of the enterprise facility or network 902 may upload policy and access requests back across the Internet 954 and through to the threat management facility 900. The Internet 954 however, is also the path through which threats may be transmitted from their source, and an endpoint computer security facility 952 may be configured to protect a device outside the network 902 through locally deployed protective measures and through suitable interactions with the threat management facility 900.

Thus, if the mobile client facility were to attempt to connect into an unprotected connection point, such as at a secondary location 908 hat is not a part of the network 902, the mobile client facility 944 may be required to request network interactions through the threat management facility 900, where contacting the threat management facility 900 may be performed prior to any other network action. In embodiments, the client facility's 944 endpoint computer security facility 952 may manage actions in unprotected network environments such as when the client facility (e.g., client 944F) is in a secondary location 908, where the endpoint computer security facility 952 may dictate what applications, actions, resources, users, etc. are allowed, blocked, modified, or the like.

The secondary location 908 may have no endpoint computer security facilities 952 as a part of its components, such as its firewalls 938B, servers 942B, clients 944G, hubs and routers 948C-D, and the like. As a result, the components of the secondary location 908 may be open to threat attacks, and become potential sources of threats, as well as any mobile enterprise facility clients 944B-F that may be connected to the secondary location's 908 network. In this instance, these components may now unknowingly spread a threat to other connected to the network 902.

Some threats do not come directly from the Internet 954. For example, a physical proximity threat 910 may be deployed on a client device while that device is connected to an unprotected network connection outside the enterprise facility 902, and when the device is subsequently connected to a client 944 on the network 902, the device can deploy the malware or otherwise pose a threat. In embodiments, the endpoint computer security facility 952 may protect the network 902 against these types of physical proximity threats 910, for instance, through scanning any device prior to allowing data transfers, through security validation certificates, through establishing a safe zone within the network 902 to receive data for evaluation, and the like.

Figure 10:
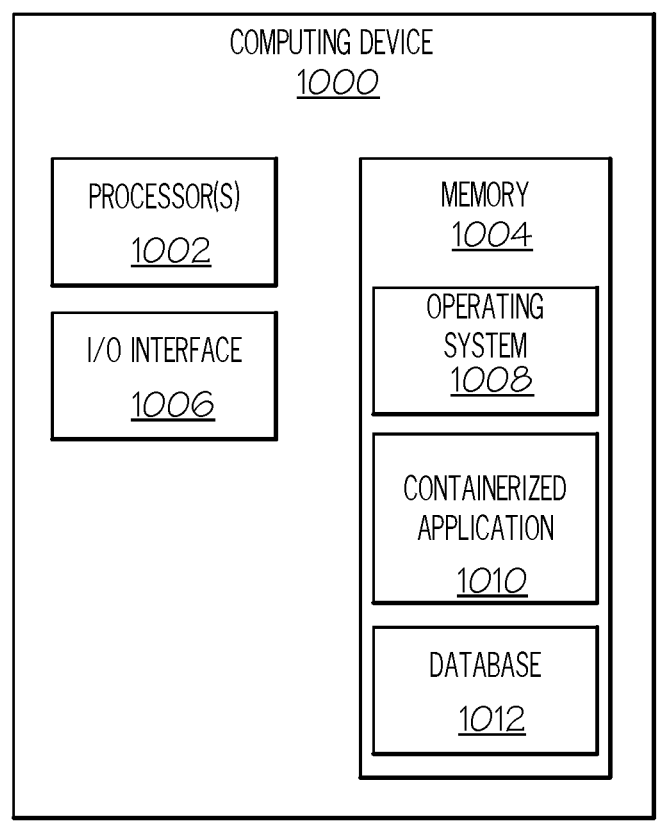
FIG. 10 is a diagram of a computing device configured for processing computer network traffic in a containerized computing environment according to an example embodiment.

FIG. 10 is a diagram of an example computing device 1000, according to an example embodiment. The computing device 1000 may include one or more processors 1002, non-transitory computer readable medium or memory 1004, I/O interface devices 1006, which may include a network interface for wired or wireless communications. The computer readable medium 1004 may store an operating system 1008, and a data section 1012. The computer readable medium 1004 may also store at least one container application 1010, for example, the container protection system 414, some or all of the containerized computing environments 101, 301, 401, or the threat management computer systems 104, 204, 304, 404, 504.

The computing device 1000 may be along the path from a network to an end device, and the application may be constructed and arranged to perform some or all of the methods 600, 700, and 800 above. An "application" or "module" as used to describe embodiments may refer to a hardware-based module, software-based application or module or may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device 1004 of the computer system. An application or module (whether hardware, software, or a combination thereof) may be designed to implement or execute one or more particular described functions or routines. In some embodiments, the computer 1000 may be part of a firewall, IPS, or other security device of the containerized computing environment. In other embodiments, the computer 1000 is a standalone device that communicates via a wired or wireless connection with the containerized computing environment.

In operation, the processor 1002 may execute the application 1010 stored in the computer readable medium 1004. The application 1010 may include software instructions that, when executed by the processor 1002, cause the processor 1002 to perform operations for applying an appropriate security policy to provide for admission control in the containerized computing environment. In doing so, the computing device 1000 may communicate with other electronic devices via the I/O interfaces 1006.

Although the foregoing figures illustrate various embodiments of the disclosed systems and methods, additional and/or alternative embodiments are contemplated as falling within the scope of this disclosure. For example, in one embodiment, this disclosure provides a method for performing admission control in a containerized computing environment. The method includes deploying, by one or more processors of a computer system, the containerized computing environment, receiving, by the containerized computing environment, constraints associated with admission control for containers, the constraints related to container security, and receiving, by the containerized computing environment, a request for creating a container. The method includes determining, by an admission controller of the containerized computing environment, a quality metric of the container associated with the received request, performing, by the admission controller of the containerized computing environment, admission control prior to the creating of the container by applying the constraints using the determined quality metric, and allowing or disallowing, by the admission controller of the containerized computing environment, creation of the container based on the performing the admission control.

In another embodiment, the method further includes providing a threat management computer system connected to the containerized computing environment, receiving, by the threat management computer system, the constraints from inputs by an administrator, and transmitting, by the threat management computer system, the constraints to the containerized computing environment.

In a further embodiment of the method, the threat management computer system is a cloud-based threat management computer system configured to manage security for the containerized computing environment, and the containerized computing environment is deployed at an enterprise facility that is connected to the cloud-based threat management computer system.

In yet another embodiment of the method, the threat management computer system includes a container inspection system connected to the containerized computing environment, and the determining the quality metric of the container associated with the received request further includes: requesting, by the admission controller of the containerized computing environment, inspection information related to the container from the container inspection system, transmitting, by the container inspection system, the inspection information related to the container to the admission controller of the containerized computing environment, receiving, by the admission controller of the containerized computing environment, the inspection information related to the container, and using, by the threat management computer system, the inspection information to determine the quality metric of the container.

In yet a further embodiment of the method, the container inspection system includes a plurality of container inspection systems, the inspection information includes information generated by each of the plurality of container inspection systems, and the constraints include rules associated with the inspection information associated with each of the plurality of container inspection systems.

In another embodiment of the method, the quality metric is a quality score associated with a container image of the container determined using a container inspection system, wherein the quality metric includes at least one of: a testing code coverage metric, a number of bugs, a cleanliness metric, a container image repository location metric, and a security vulnerability metric.

In a further embodiment of the method, the constraints include at least one of: parameters associated with a testing code coverage metric, parameters associated with a number of bugs, parameters associated with a cleanliness metric, parameters associated with allowed or disallowed namespaces. a container image repository location, and levels of vulnerability associated with a scan of a container image of the container using a container inspection system.

In yet another embodiment of the method, the admission controller is configured to enforce the constraints, and wherein the admission controller is in communication with a container inspection system used in determining the quality metric of the container.

In yet a further embodiment, the method further includes fetching, by the admission controller using a remote procedure call mechanism by invoking one or more application programing interfaces (APIs), inspection information related to the container, the inspection information usable to determine the quality metric of the container.

In another embodiment of the method, the quality metric corresponds to a count of security issues associated with the container, and the method further includes determining, by the admission controller from the inspection information, that the quality metric is greater than zero, and disallowing, by the admission controller, the container to be created.

In another embodiment, this disclosure provides for a computer system having a containerized computing environment, a threat management computer system having one or more processors; one or more memory devices coupled to the one or more processors and/or the containerized computing environment, and one or more computer readable storage devices coupled to the one or more processors and/or the containerized computing environment, wherein the one or more storage devices contain program code executable by the threat management computer system and/or the containerized computing environment via the one or more memory devices to implement a method for performing admission control in the containerized computing environment. The method includes receiving, by the containerized computing environment, constraints associated with admission control for containers, the constraints related to container security, receiving, by the containerized computing environment, a request for creating a container. The method further includes determining, by an admission controller of the containerized computing environment, a quality metric of the container associated with the received request, performing, by the admission controller of the containerized computing environment, admission control prior to the creating of the container by applying the constraints using the determined quality metric, and allowing or disallowing, by the admission controller of the containerized computing environment, creation of the container based on the performing the admission control.

In another embodiment of the computer system, the method further includes providing a threat management computer system connected to the containerized computing environment, receiving, by the threat management computer system, the constraints from inputs by an administrator, and transmitting, by the threat management computer system, the constraints to the containerized computing environment. Moreover, the threat management computer system is a cloud-based threat management computer system configured to manage security for the containerized computing environment, and the containerized computing environment is deployed at an enterprise facility that is connected to the cloud-based threat management computer system.

In a further embodiment of the computer system, the threat management computer system includes a container inspection system connected to the containerized computing environment and the determining the quality metric of the container associated with the received request further includes requesting, by the admission controller of the containerized computing environment, inspection information related to the container from the container inspection system, transmitting, by the container inspection system, the inspection information related to the container to the admission controller of the containerized computing environment, receiving, by the admission controller of the containerized computing environment, the inspection information related to the container, using, by the threat management computer system, the inspection information to determine the quality metric of the container. Moreover, the container inspection system may include a plurality of container inspection systems; the inspection information includes information generated by each of the plurality of container inspection systems; and the constraints include rules associated with the inspection information associated with each of the plurality of container inspection systems.

In yet another embodiment of the computer system, the constraints include at least one of parameters associated with a testing code coverage metric, parameters associated with a number of bugs, parameters associated with a cleanliness metric, parameters associated with allowed or disallowed namespaces, a container image repository location, and levels of vulnerability associated with a scan of a container image of the container using a container inspection system.

In yet a further embodiment of the computer system, the admission controller is configured to enforce the constraints, and wherein the admission controller is in communication with a container inspection system used in determining the quality metric of the container, and the quality metric corresponds to a count of vulnerabilities associated with the container. In this embodiment, the method further includes fetching, by the admission controller using a remote procedure call mechanism by invoking one or more application programing interfaces (APIs), inspection information related to the container, the inspection information usable to determine the quality metric of the container, determining, by the admission controller from the inspection information, that the quality metric is greater than zero, and disallowing, by the admission controller, the container to be created.

In another embodiment, this disclosure provides for a computer program product for performing admission control in a containerized computing environment, the computer program product including one or more computer readable storage media having computer readable program code collectively stored on the one or more computer readable storage media, the computer readable program code being executed by one or more processors of a computer system, including a threat management computer system and a containerized computing environment connected to the threat management computer system, to cause the computer system to perform a method. The method includes receiving, by the containerized computing environment, constraints associated with admission control for containers, the constraints related to container security, receiving, by the containerized computing environment, a request for creating a container. The method further includes determining, by an admission controller of the containerized computing environment, a quality metric of the container associated with the received request, performing, by the admission controller of the containerized computing environment, admission control prior to the creating of the container by applying the constraints using the determined quality metric, and allowing or disallowing, by the admission controller of the containerized computing environment, creation of the container based on the performing the admission control.

In another embodiment of the computer program product the computer system includes a threat management computer system connected to the containerized computing environment, and the method further includes receiving, by the threat management computer system, the constraints from inputs by an administrator, and transmitting, by the threat management computer system, the constraints to the containerized computing environment.

In a further embodiment of the computer program product, the threat management computer system includes a container inspection system connected to the containerized computing environment. The determining the quality metric of the container associated with the received request further comprises: requesting, by the admission controller of the containerized computing environment, inspection information related to the container from the container inspection system, transmitting, by the container inspection system, the inspection information related to the container to the admission controller of the containerized computing environment, receiving, by the admission controller of the containerized computing environment, the inspection information related to the container and using, by the threat management computer system, the inspection information to determine the quality metric of the container.

In yet another embodiment of the computer program product, the constraints include at least one of: parameters associated with a testing code coverage metric, parameters associated with a number of bugs, parameters associated with a cleanliness metric, parameters associated with allowed or disallowed namespaces, a container image repository location, and levels of vulnerability associated with a scan of a container image of the container using a container inspection system.

In yet a further embodiment of the computer program product, the method further includes fetching, by the admission controller using a remote procedure call mechanism by invoking one or more application programing interfaces (APIs), inspection information related to the container, the inspection information usable to determine the quality metric of the container, determining, by the admission controller from the inspection information, that the quality metric is greater than zero, and disallowing, by the admission controller, the container to be created.

It will be appreciated that the modules, processes, systems, and sections described above may be implemented in hardware, hardware programmed by software, software instructions stored on a nontransitory computer readable medium or a combination of the above. A system as described above, for example, may include a processor configured to execute a sequence of programmed instructions stored on a nontransitory computer readable medium. For example, the processor may include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions may be compiled from source code instructions provided in accordance with a programming language such as Java, C, C++, C#.net, assembly or the like. The instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein may be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that may be used on a variety of computer platforms. Alternatively, embodiments of the disclosed method, system, and computer program product may be implemented partially or fully in hardware using, for example, standard logic circuits or a VLSI design. Other hardware or software may be used to implement embodiments depending on the speed and/or efficiency requirements of the systems, the particular function, and/or particular software or hardware system, microprocessor, or microcomputer being utilized. Embodiments of the method, system, and computer program product may be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) may be implemented in software executed on a programmed general-purpose computer, a special purpose computer, a microprocessor, a network server or switch, or the like.

It is, therefore, apparent that there is provided, in accordance with the various embodiments disclosed herein, methods, systems and computer readable media for applying an appropriate security policies or rules associated with admission control during the creating, adding, or persisting containers, pods or the like in a containerized computing environment.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The invention claimed is:

1. A method for performing admission control in a containerized computing environment, comprising:
  deploying, by one or more processors of a computer system, the containerized computing environment;

receiving, by the containerized computing environment, constraints associated with admission control for containers, the constraints related to container security;

receiving, by the containerized computing environment, a request for creating a container;

determining, by an admission controller of the containerized computing environment, a quality metric of the container associated with the received request;

performing, by the admission controller of the containerized computing environment, admission control prior to the creating of the container by applying the constraints using the determined quality metric; and allowing or disallowing, by the admission controller of the containerized computing environment, creation of the container based on the performing the admission control.

2. The method of claim 1, further comprising:

providing a threat management computer system connected to the containerized computing environment;

receiving, by the threat management computer system, the constraints from inputs by an administrator; and transmitting, by the threat management computer system, the constraints to the containerized computing environment.

3. The method of claim 2, wherein:

the threat management computer system is a cloud-based threat management computer system configured to manage security for the containerized computing environment; and the containerized computing environment is deployed at an enterprise facility that is connected to the cloud-based threat management computer system.

4. The method of claim 2, wherein the threat management computer system includes a container inspection system connected to the containerized computing environment, wherein the determining the quality metric of the container associated with the received request further comprises:

requesting, by the admission controller of the containerized computing environment, inspection information related to the container from the container inspection system;

transmitting, by the container inspection system, the inspection information related to the container to the admission controller of the containerized computing environment;

receiving, by the admission controller of the containerized computing environment, the inspection information related to the container; and using, by the threat management computer system, the inspection information to determine the quality metric of the container.

5. The method of claim 4, wherein:

the container inspection system includes a plurality of container inspection systems;

the inspection information includes information generated by each of the plurality of container inspection systems; and the constraints include rules associated with the inspection information associated with each of the plurality of container inspection systems.

6. The method of claim 1, wherein the quality metric is a quality score associated with a container image of the container determined using a container inspection system, wherein the quality metric includes at least one of:

a testing code coverage metric;
a number of bugs;
a cleanliness metric;

a container image repository location metric; and
a security vulnerability metric.

7. The method of claim 1, wherein the constraints include at least one of:

parameters associated with a testing code coverage metric;

parameters associated with a number of bugs;

parameters associated with a cleanliness metric;

parameters associated with allowed or disallowed namespaces;

a container image repository location; and levels of vulnerability associated with a scan of a container image of the container using a container inspection system.

8. The method of claim 1, wherein the admission controller is configured to enforce the constraints, and wherein the admission controller is in communication with a container inspection system used in determining the quality metric of the container.

9. The method of claim 8, further comprising:

fetching, by the admission controller using a remote procedure call mechanism by invoking one or more application programing interfaces (APIs), inspection information related to the container, the inspection information usable to determine the quality metric of the container.

10. The method of claim 9, wherein the quality metric corresponds to a count of security issues associated with the container, the method further comprising:

determining, by the admission controller from the inspection information, that the quality metric is greater than zero; and disallowing, by the admission controller, the container to be created.

11. A computer system, comprising:

a containerized computing environment;

a threat management computer system having one or more processors;

one or more memory devices coupled to at least one of the one or more processors and the containerized computing environment; and one or more computer readable storage devices coupled to at least one of the one or more processors and the containerized computing environment, wherein the one or more storage devices contain program code executable by at least one of the threat management computer system and the containerized computing environment via the one or more memory devices to implement a method for performing admission control in the containerized computing environment, the method comprising:

receiving, by the containerized computing environment, constraints associated with admission control for containers, the constraints related to container security;

receiving, by the containerized computing environment, a request for creating a container;

determining, by an admission controller of the containerized computing environment, a quality metric of the container associated with the received request;

performing, by the admission controller of the containerized computing environment, admission control prior to the creating of the container by applying the constraints using the determined quality metric; and allowing or disallowing, by the admission controller of the containerized computing environment, creation of the container based on the performing the admission control.

12. The computer system of claim 11, the method further comprising:
providing a threat management computer system connected to the containerized computing environment;
receiving, by the threat management computer system, the constraints from inputs by an administrator; and
transmitting, by the threat management computer system, the constraints to the containerized computing environment,
wherein:
the threat management computer system is a cloud-based threat management computer system configured to manage security for the containerized computing environment; and
the containerized computing environment is deployed at an enterprise facility that is connected to the cloud-based threat management computer system.

13. The computer system of claim 12, wherein the threat management computer system includes a container inspection system connected to the containerized computing environment, wherein the determining the quality metric of the container associated with the received request further comprises:
requesting, by the admission controller of the containerized computing environment, inspection information related to the container from the container inspection system;
transmitting, by the container inspection system, the inspection information related to the container to the admission controller of the containerized computing environment;
receiving, by the admission controller of the containerized computing environment, the inspection information related to the container; and
using, by the threat management computer system, the inspection information to determine the quality metric of the container.

14. The computer system of claim 11, wherein the constraints include at least one of:
parameters associated with a testing code coverage metric;
parameters associated with a number of bugs;
parameters associated with a cleanliness metric;
parameters associated with allowed or disallowed namespaces;
a container image repository location; and
levels of vulnerability associated with a scan of a container image of the container using a container inspection system.

15. The computer system of claim 11, wherein:
the admission controller is configured to enforce the constraints, and wherein the admission controller is in communication with a container inspection system used in determining the quality metric of the container, and
the quality metric corresponds to a count of vulnerabilities associated with the container,
the method further comprising:
fetching, by the admission controller using a remote procedure call mechanism by invoking one or more application programing interfaces (APIs), inspection information related to the container, the inspection information usable to determine the quality metric of the container;
determining, by the admission controller from the inspection information, that the quality metric is greater than zero; and
disallowing, by the admission controller, the container to be created.

16. A computer program product for performing admission control in a containerized computing environment, the computer program product including one or more non-transitory computer readable storage media having computer readable program code collectively stored on the one or more computer readable storage media, the computer readable program code being executed by one or more processors of a computer system, including a threat management computer system and a containerized computing environment connected to the threat management computer system, to cause the computer system to perform a method comprising:
receiving, by the containerized computing environment, constraints associated with admission control for containers, the constraints related to container security;
receiving, by the containerized computing environment, a request for creating a container;
determining, by an admission controller of the containerized computing environment, a quality metric of the container associated with the received request;
performing, by the admission controller of the containerized computing environment, admission control prior to the creating of the container by applying the constraints using the determined quality metric; and
allowing or disallowing, by the admission controller of the containerized computing environment, creation of the container based on the performing the admission control.

17. The computer program product of claim 16, wherein the computer system includes a threat management computer system connected to the containerized computing environment, the method further comprising:
receiving, by the threat management computer system, the constraints from inputs by an administrator; and
transmitting, by the threat management computer system, the constraints to the containerized computing environment.

18. The computer program product of claim 17, wherein the threat management computer system includes a container inspection system connected to the containerized computing environment, wherein the determining the quality metric of the container associated with the received request further comprises:
requesting, by the admission controller of the containerized computing environment, inspection information related to the container from the container inspection system;
transmitting, by the container inspection system, the inspection information related to the container to the admission controller of the containerized computing environment;
receiving, by the admission controller of the containerized computing environment, the inspection information related to the container; and
using, by the threat management computer system, the inspection information to determine the quality metric of the container.

19. The computer program product of claim 16, wherein the constraints include at least one of:

parameters associated with a testing code coverage metric;

parameters associated with a number of bugs;

parameters associated with a cleanliness metric;

parameters associated with allowed or disallowed namespaces;

a container image repository location; and levels of vulnerability associated with a scan of a container image of the container using a container inspection system.

20. The computer program product of claim 16, the method further comprising:

fetching, by the admission controller using a remote procedure call mechanism by invoking one or more application programing interfaces (APIs), inspection information related to the container, the inspection information usable to determine the quality metric of the container;

determining, by the admission controller from the inspection information, that the quality metric is greater than zero; and disallowing, by the admission controller, the container to be created.

\* \* \* \* \*